United States Patent
Jaeger

(10) Patent No.: US 10,105,659 B2
(45) Date of Patent: Oct. 23, 2018

(54) DUAL CONTROL LATERAL AIR MANIFOLD ASSEMBLY

(71) Applicant: Claudius Jaeger, Boulder, CO (US)

(72) Inventor: Claudius Jaeger, Boulder, CO (US)

( * ) Notice: Subject to any disclaimer, the term of this patent is extended or adjusted under 35 U.S.C. 154(b) by 0 days.

(21) Appl. No.: 14/997,328

(22) Filed: Jan. 15, 2016

(65) Prior Publication Data

US 2016/0199792 A1 Jul. 14, 2016

Related U.S. Application Data

(63) Continuation-in-part of application No. 14/451,287, filed on Aug. 4, 2014, now Pat. No. 9,561,480.

(51) Int. Cl.
*B01F 3/04* (2006.01)
*C02F 3/20* (2006.01)

(52) U.S. Cl.
CPC ........ *B01F 3/04262* (2013.01); *B01F 3/0412* (2013.01); *B01F 3/04269* (2013.01);
(Continued)

(58) Field of Classification Search
CPC ................ B01F 3/0412; B01F 3/04262; B01F 3/04269; B01F 2003/04312;
(Continued)

(56) References Cited

U.S. PATENT DOCUMENTS

| | | |
|---|---|---|
| 1,810,394 A | 6/1931 | Jens et al. |
| 2,415,048 A * | 1/1947 | Sharp .................. B01F 3/04255 210/199 |

(Continued)

FOREIGN PATENT DOCUMENTS

| | | | |
|---|---|---|---|
| CA | 2406904 A1 | * | 4/2003 |
| CN | 105431218 A | | 3/2016 |

(Continued)

OTHER PUBLICATIONS

EPO translation of Ott WO 2006/063538 A1 published Jun. 2006.*
"Coupling" Wikipedia published Jun. 8, 2010 as access at < https://web.archive.org/web/20100608215437/https://en.wikipedia.org/wiki/Coupling_(piping)>.*

(Continued)

*Primary Examiner* — Amber R Orlando
*Assistant Examiner* — Stephen Hobson
(74) *Attorney, Agent, or Firm* — Johnson, Marcou & Isaacs, LLC; Jennifer S. Stachniak

(57) ABSTRACT

An aeration element for gasification or aeration of liquids includes an essentially flattened, rigid support element having a substantially oval cross-section and corrugated outer surfaces, the corrugated outer surfaces including ridges defining grooves therebetween; a threaded opening for receiving a cooperating fitting for connection to an air supply; and a flexible membrane of elastomeric material disposed around the support element. An assembly bracket includes upper and portions that can be cooperatingly attached to one another about the aeration element for securing the aeration element to a floor of a tank or pool. The assembly bracket includes through-going passages for enabling water to circulate around the bracket and reduce buoyancy of the assembly. Two aeration elements of shorter lengths can be positioned adjacent two one another, secured within assembly brackets, and connected at adjacent ends, so that one of the aeration elements functions as a conduit to the other aeration element when air is supplied into one of the aeration elements.

9 Claims, 33 Drawing Sheets

(52) U.S. Cl.
CPC .............. *C02F 3/20* (2013.01); *C02F 3/201*
(2013.01); *B01F 2003/04148* (2013.01); *B01F 2003/04177* (2013.01); *B01F 2003/04191* (2013.01); *B01F 2003/04276* (2013.01); *B01F 2003/04312* (2013.01); *B01F 2003/04872* (2013.01); *C02F 2203/006* (2013.01); *Y02W 10/15* (2015.05)

(58) Field of Classification Search
CPC .. B01F 2003/04872; B01F 2003/04191; B01F 2003/04177; B01F 2003/04148; B01F 2003/04276; C02F 3/20; C02F 3/201; C02F 2203/006; Y02W 10/15
See application file for complete search history.

(56) References Cited

U.S. PATENT DOCUMENTS

| | | | |
|---|---|---|---|
| 3,603,509 A | 9/1971 | Nechine | |
| 3,672,571 A * | 6/1972 | Goodricke | A01G 25/02 239/145 |
| 3,837,629 A * | 9/1974 | Matras | B01F 3/04113 251/149.2 |
| 3,953,553 A * | 4/1976 | Thayer | B01F 3/0412 261/122.1 |
| 4,012,470 A * | 3/1977 | Thayer | B01F 3/0412 138/171 |
| 4,029,581 A * | 6/1977 | Clough, Jr. | B01F 3/04113 210/220 |
| 4,152,259 A * | 5/1979 | Molvar | B01F 3/0876 210/220 |
| 4,215,082 A * | 7/1980 | Danel | B01F 3/0412 210/220 |
| 4,243,616 A | 1/1981 | Wyss | |
| 4,273,732 A * | 6/1981 | Roediger | C02F 3/203 210/220 |
| 4,290,982 A * | 9/1981 | Bauman | A61H 33/025 261/124 |
| 4,431,597 A * | 2/1984 | Cramer | B01F 7/00741 261/93 |
| 4,521,517 A * | 6/1985 | Gauthier | C05F 17/027 435/290.1 |
| 4,563,277 A * | 1/1986 | Tharp | B01F 3/0412 210/220 |
| 4,783,029 A | 11/1988 | Geppert et al. | |
| 4,960,546 A * | 10/1990 | Tharp | B01F 3/0412 261/122.1 |
| 5,013,493 A * | 5/1991 | Tharp | B01F 3/0412 210/220 |
| 5,015,421 A | 5/1991 | Messner et al. | |
| 5,057,284 A * | 10/1991 | Emmett, Jr. | B01F 3/04269 422/225 |
| RE33,812 E | 2/1992 | Schneider | |
| 5,227,136 A * | 7/1993 | Hanify | B01F 3/04269 422/225 |
| 5,290,487 A * | 3/1994 | Ludwig | B01F 3/0412 210/236 |
| 5,316,671 A * | 5/1994 | Murphy | B01D 21/0018 210/121 |
| 5,378,355 A * | 1/1995 | Winkler | C02F 3/20 134/171 |
| 5,534,202 A * | 7/1996 | Roberts | B01D 24/24 261/122.1 |
| 5,587,114 A | 12/1996 | Tharp et al. | |
| 5,690,864 A * | 11/1997 | Tyer | B01F 3/04241 261/122.1 |
| 5,714,062 A * | 2/1998 | Winkler | B01F 3/0412 210/220 |
| 5,804,105 A * | 9/1998 | Allison | B01F 3/04269 261/122.2 |
| 5,851,447 A | 12/1998 | Tyer | |
| 5,851,448 A * | 12/1998 | Tyer | B01F 3/04241 261/122.1 |
| 5,868,971 A * | 2/1999 | Meyer | B01F 3/0412 261/122.2 |
| 5,906,774 A * | 5/1999 | Loy | B01F 3/0412 210/220 |
| 6,086,056 A * | 7/2000 | Leask | B01F 3/0412 210/221.2 |
| 6,193,890 B1 * | 2/2001 | Pedersen | B01D 61/18 210/636 |
| 6,367,783 B1 * | 4/2002 | Raftis | B01F 3/04269 261/122.1 |
| 6,367,784 B1 * | 4/2002 | Jager | B01F 3/04113 261/122.2 |
| 6,406,005 B1 | 6/2002 | Lawson et al. | |
| 6,511,054 B1 * | 1/2003 | Green | B01F 3/0412 261/122.1 |
| 7,044,453 B2 * | 5/2006 | Tharp | B01F 3/04269 261/122.1 |
| 7,186,343 B2 * | 3/2007 | Rabie | B01D 61/18 210/321.79 |
| 7,255,333 B2 * | 8/2007 | Casper | B01F 3/0412 261/122.1 |
| 7,267,766 B2 | 9/2007 | Campion et al. | |
| 7,284,747 B2 * | 10/2007 | Fiedler | B01F 3/0865 239/565 |
| 7,497,421 B2 * | 3/2009 | Jager | B01F 3/04269 261/122.2 |
| 7,806,389 B2 * | 10/2010 | Abello | B01F 3/04269 261/122.1 |
| 8,011,643 B2 * | 9/2011 | Tharp | B01F 3/04113 210/242.2 |
| 8,016,272 B2 * | 9/2011 | Tharp | B01F 3/0412 210/242.2 |
| 8,016,273 B1 * | 9/2011 | Dartez | B01F 3/04113 261/120 |
| 8,132,794 B2 * | 3/2012 | Hinde | B01F 3/04113 138/118 |
| 8,221,631 B1 * | 7/2012 | Bhaskar | B01F 3/04106 210/143 |
| 8,241,497 B2 * | 8/2012 | Buch et al. | |
| 8,251,353 B2 * | 8/2012 | Meyer | |
| 8,678,358 B1 * | 3/2014 | Alenzi | |
| 9,370,752 B2 | 6/2016 | Jäger | |
| 9,561,480 B2 | 2/2017 | Jaeger et al. | |
| 9,758,400 B2 * | 9/2017 | Graves | |
| 2005/0087894 A1 * | 4/2005 | Campion | B01F 3/04113 261/120 |
| 2007/0120276 A1 * | 5/2007 | Lechner | C02F 3/203 261/122.1 |
| 2007/0182036 A1 | 8/2007 | Jager et al. | |
| 2008/0017558 A1 * | 1/2008 | Pollock | B01D 61/18 210/90 |
| 2008/0245731 A1 * | 10/2008 | Monosov | C02F 3/103 210/608 |
| 2008/0251954 A1 * | 10/2008 | Casper | B01F 3/0412 261/122.1 |
| 2010/0213624 A1 | 8/2010 | Madsen et al. | |
| 2012/0024698 A1 * | 2/2012 | Vidaurre Heiremans | B01F 13/0255 204/279 |
| 2012/0061862 A1 | 3/2012 | Tharp et al. | |
| 2015/0174536 A1 * | 6/2015 | Jaeger | C02F 3/201 261/122.1 |
| 2017/0072372 A1 * | 3/2017 | Burton | C02F 7/00 |
| 2018/0093231 A1 * | 4/2018 | Roberts | B01F 3/04248 |

FOREIGN PATENT DOCUMENTS

| | | |
|---|---|---|
| CN | 107073412 A | 8/2017 |
| DE | 632510 C | 1/1937 |
| DE | 8212021 U1 | 8/1982 |
| DE | 3319161 A1 | 11/1984 |
| DE | 3600234 A1 | 7/1987 |
| DE | 3940108 * | 6/1991 |
| DE | 4211648 A1 | 10/1993 |

(56) References Cited

FOREIGN PATENT DOCUMENTS

| | | | |
|---|---|---|---|
| DE | 20001634 U1 * | 4/2000 |
| DE | 10150180 A1 | 4/2003 |
| DE | 10220769 A1 * | 11/2003 |
| DE | 102012108400 A1 * | 3/2013 |
| EP | 1302235 A1 | 4/2003 |
| EP | 1746321 A1 | 1/2007 |
| FR | 2352580 * | 12/1977 |
| FR | 2578832 * | 9/1986 |
| FR | 2802524 * | 6/2001 |
| GB | 824376 * | 11/1959 |
| GB | 1076683 A | 7/1967 |
| GB | 1316582 * | 5/1973 |
| IN | 201747006965 A | 5/2017 |
| JP | 51120048 A | 10/1976 |
| JP | 2002013651 A | 1/2002 |
| JP | 2002263680 A | 9/2002 |
| JP | 2010104900 A | 5/2010 |
| JP | 2011519718 A | 7/2011 |
| JP | 2017526871 A | 9/2017 |
| KR | 1020150138239 | 12/2015 |
| WO | WO9427712 A1 * | 12/1994 |
| WO | WO0125159 A1 * | 4/2001 |
| WO | WO2006063538 A1 * | 6/2006 |
| WO | WO 2006063538 A1 * | 6/2006 |
| WO | 2014144586 A2 | 9/2014 |
| WO | 2016022316 A1 | 2/2016 |

OTHER PUBLICATIONS

Bergfelder, "Office Action issued in U.S. Appl. No. 13/843,625, filed Mar. 15, 2013", dated Apr. 21, 2015.

Bergfelder, "Office Action issued in U.S. Appl. No. 13/843,625, filed Mar. 15, 2013", dated Nov. 6, 2015, 7 pages.

Krasenbrink, "International Search Report and Written Opinion issued in International Application No. PCT/US2015/042213,", dated Nov. 1, 2016, 16 pages.

Mohri, "International Preliminary Report on Patentability issued in International Application No. PCT/US2014/029060,", dated Sep. 15, 2015.

Posten, "European Search Report and Opinion in European application No. 2014762448", completed Oct. 7, 2016, dated Oct. 7, 2016.

Thomas, "International Search Report and Written Opinion issued in International Application No. PCT/US2017/013473,", dated Apr. 10, 2017, 8 pages.

Wittmann-Regis, "International Preliminary Report on Patentability issued in International Application No. PCT/US2015/042213,", dated Feb. 16, 2017, 11 pages.

Young, "International Search Report and Written Opinion issued in International Application No. PCT/US2014/029060,", dated Sep. 11, 2014.

Nakamura, "First Action of Japanese Patent Application No. 2016-502975", 3 pages.

Nickitas-Etienne, "International Preliminary Report on Patentability for PCT/US2017/013473", dated Jul. 26, 2018, 7 pages.

* cited by examiner

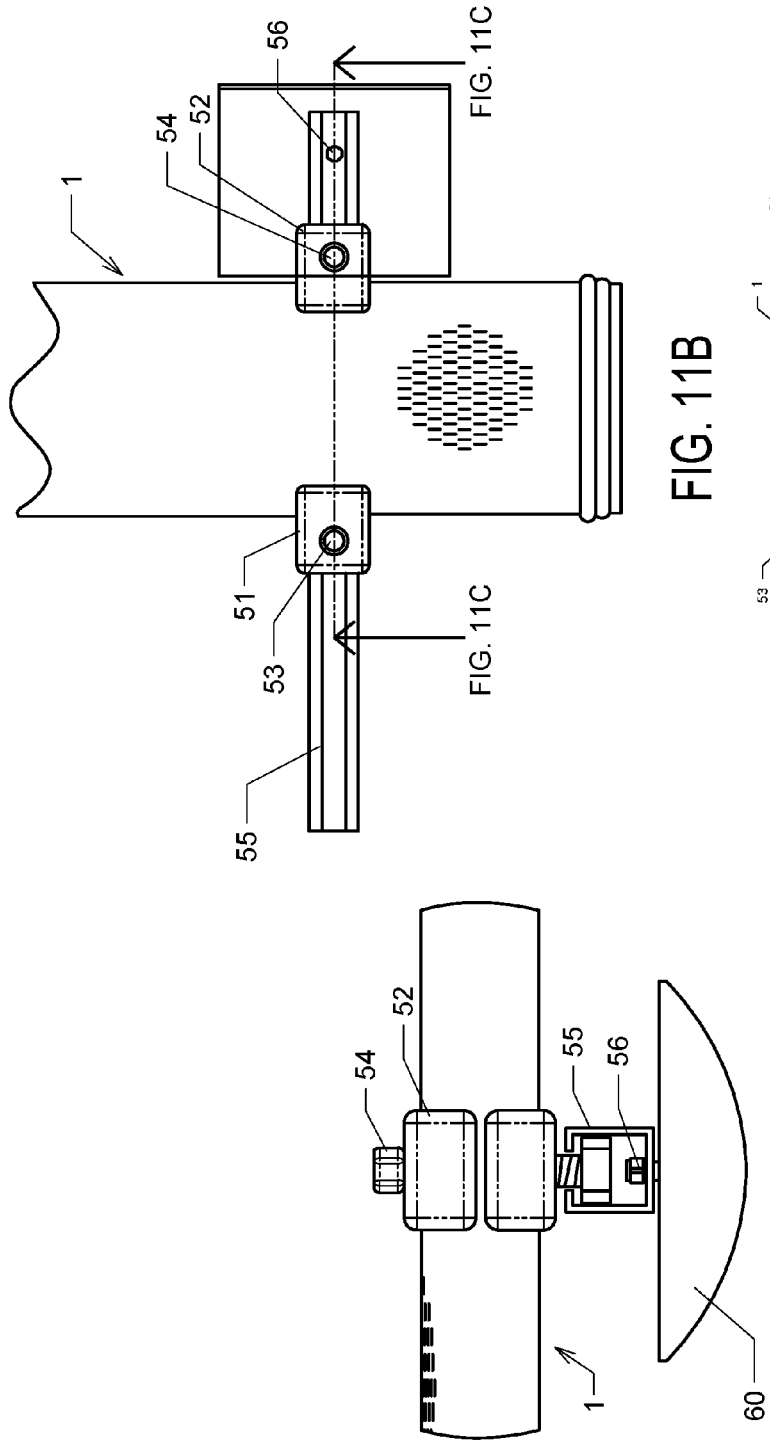

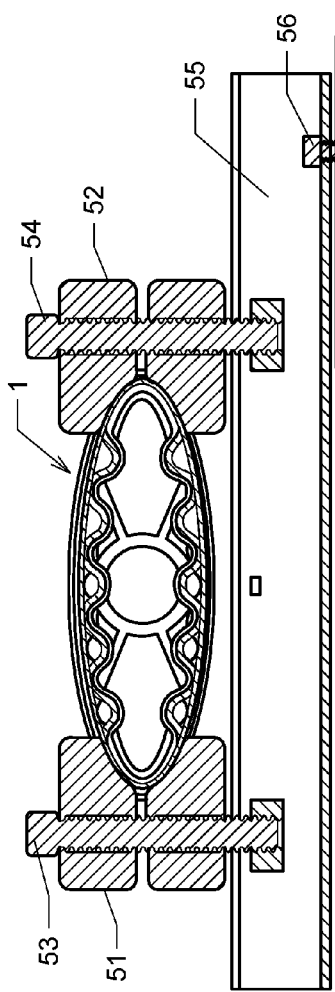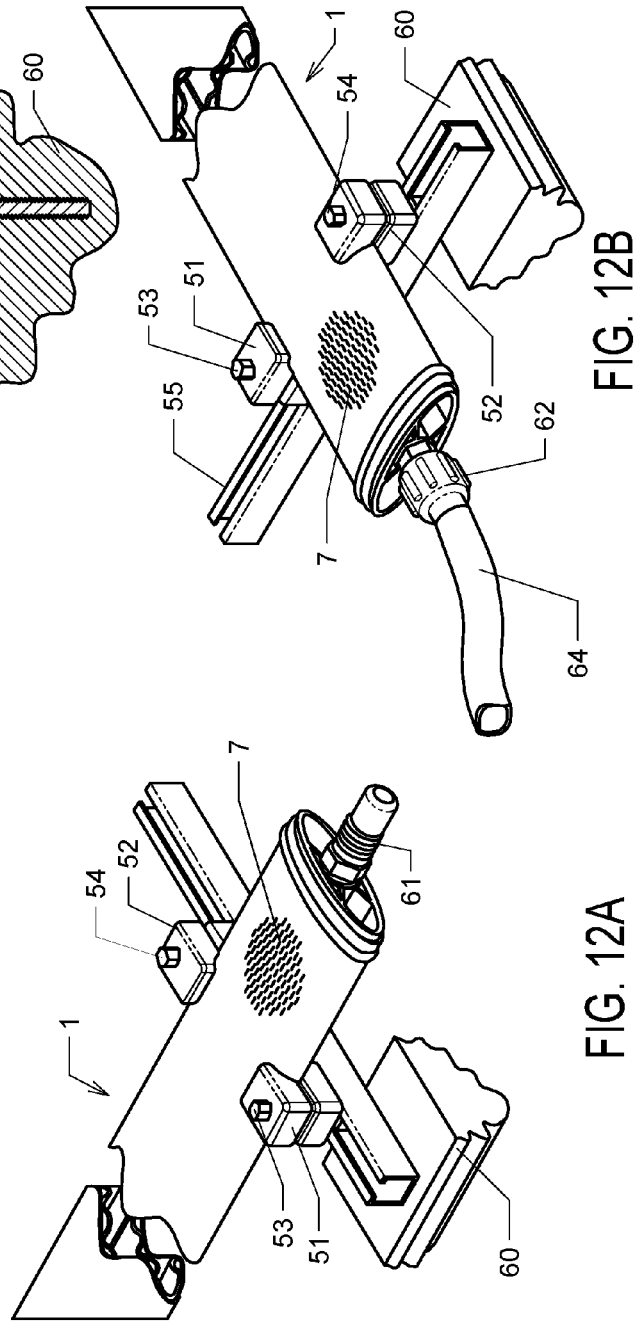

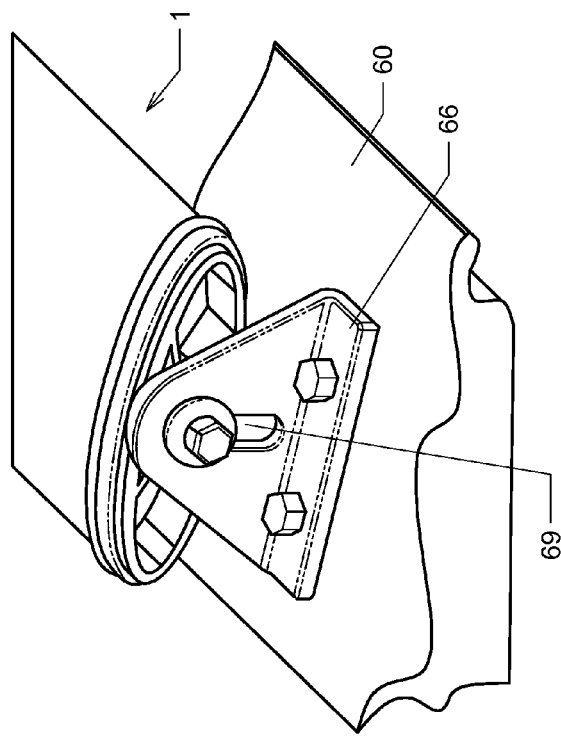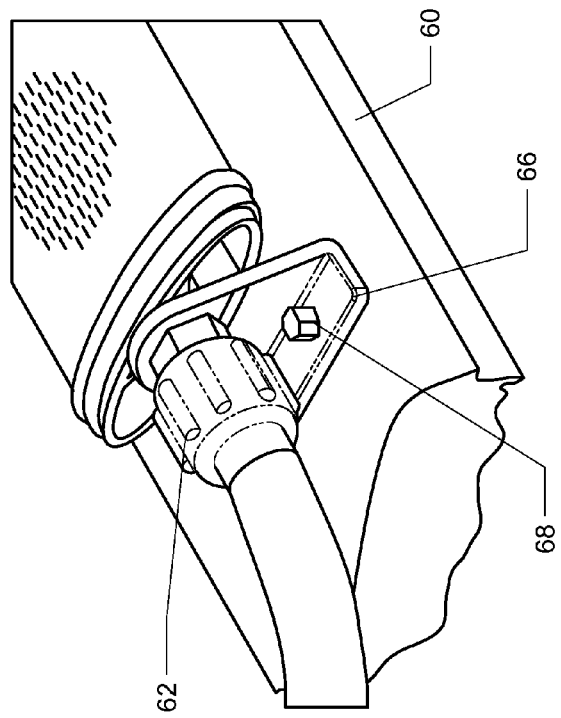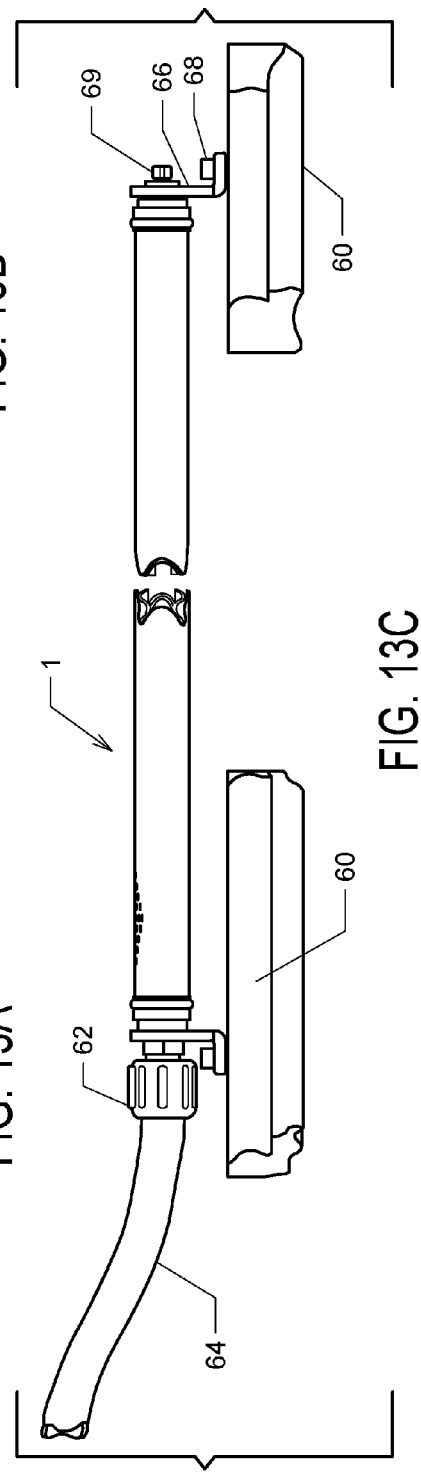
FIG. 13A
FIG. 13B
FIG. 13C

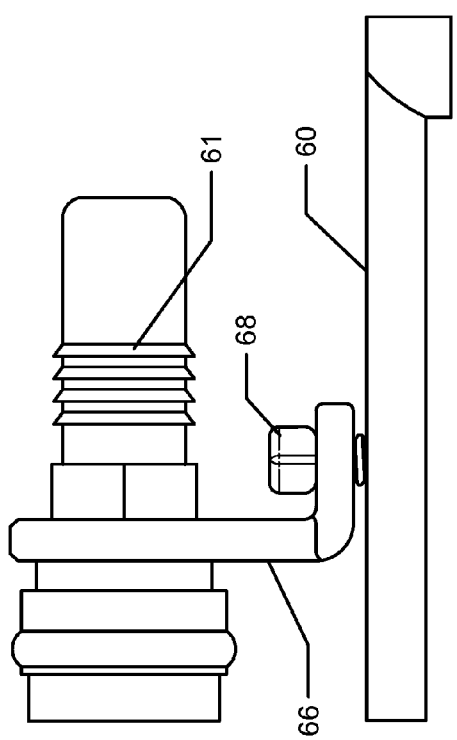
FIG. 14A
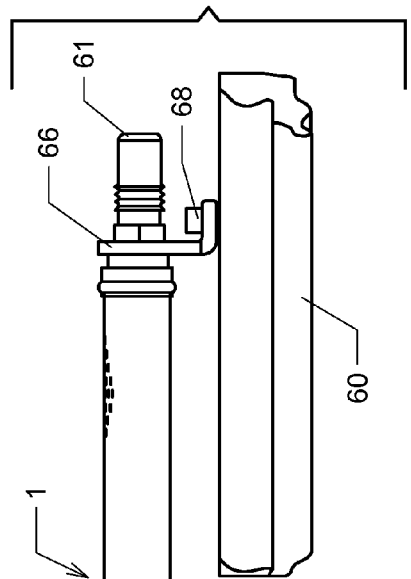
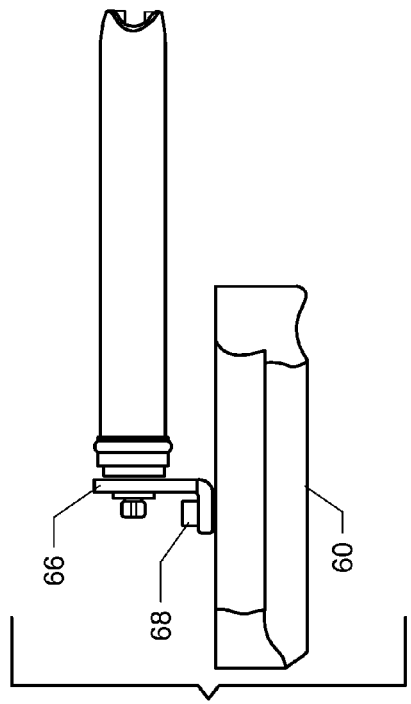
FIG. 14B

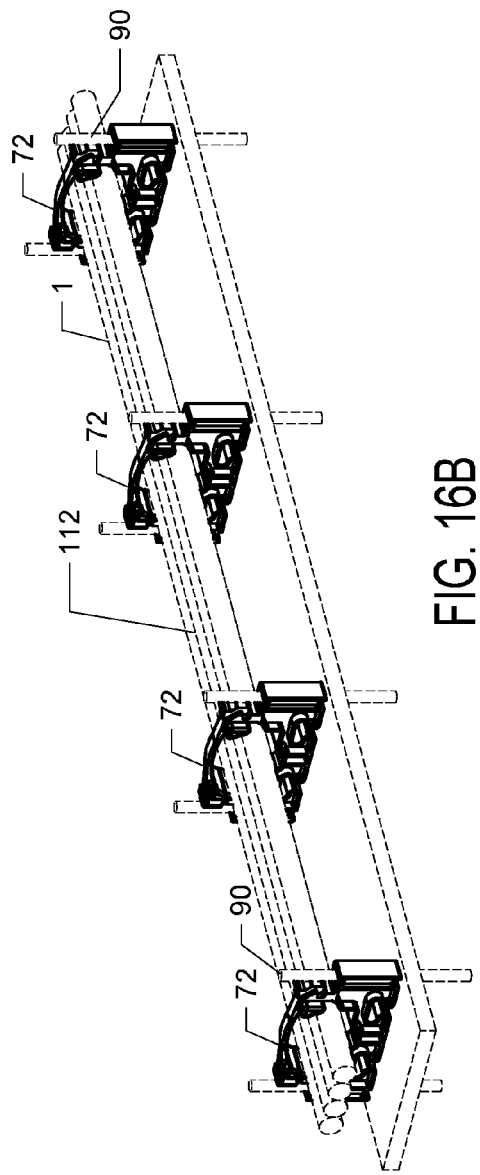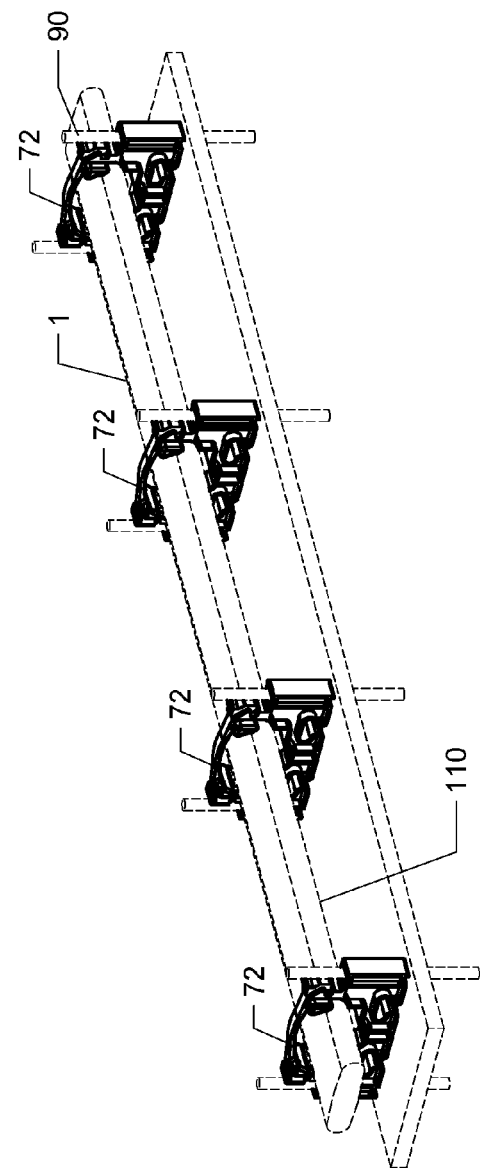

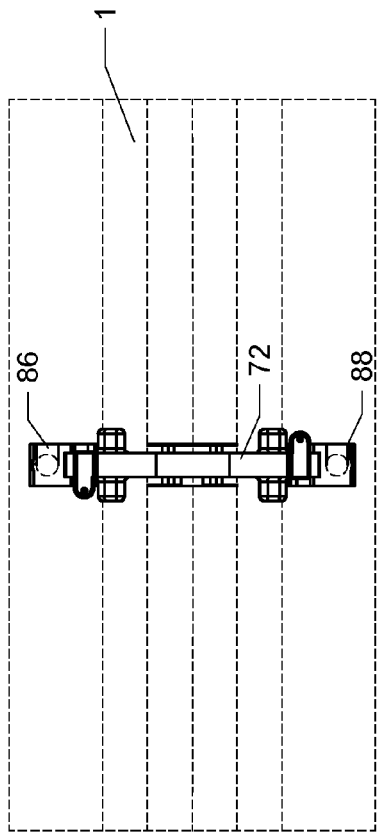
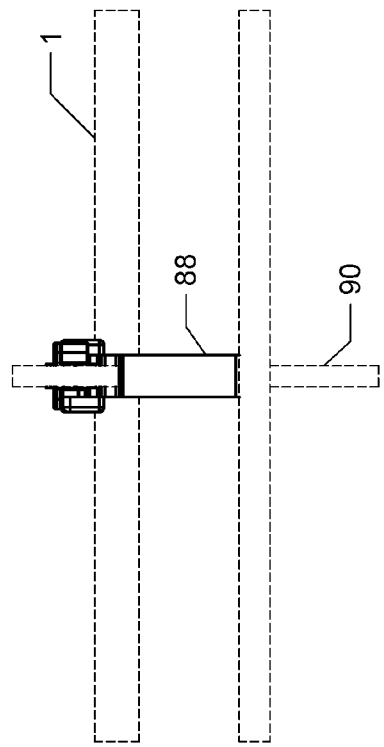
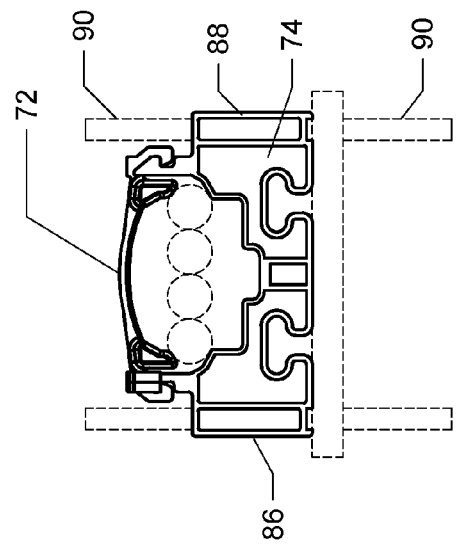
FIG. 17
FIG. 17B
FIG. 17A

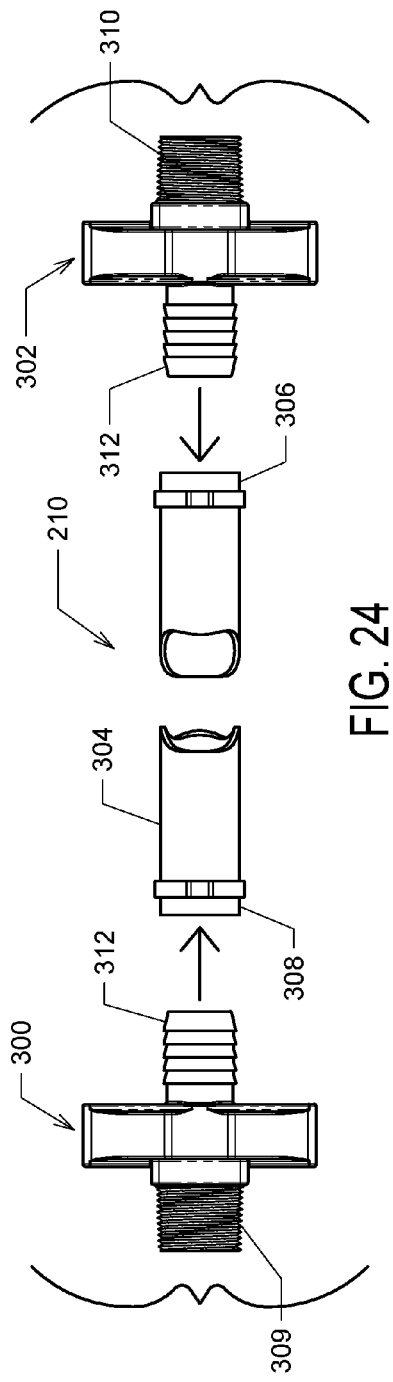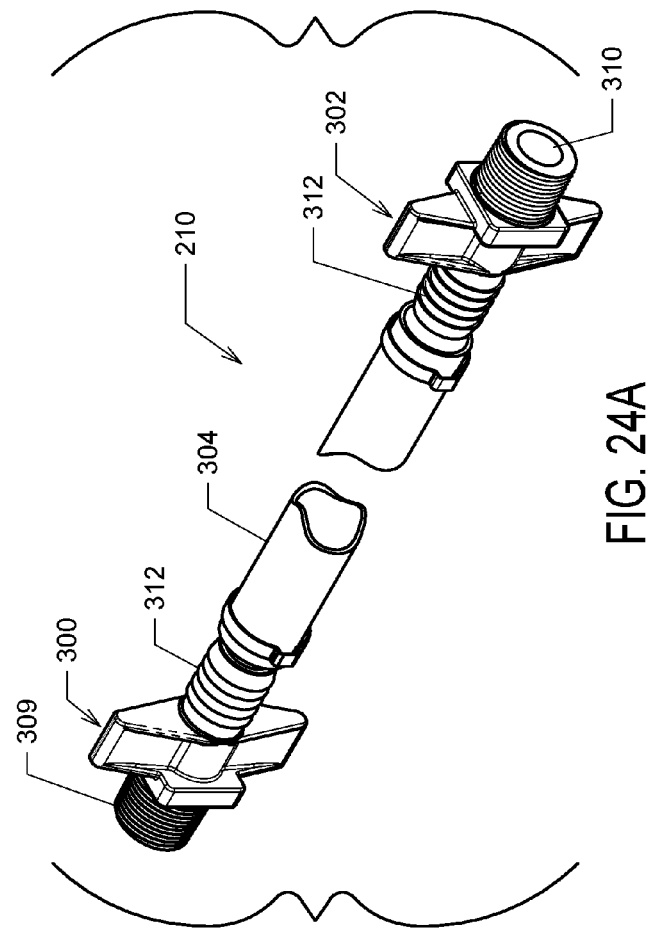
FIG. 24
FIG. 24A

DUAL CONTROL LATERAL AIR MANIFOLD ASSEMBLY

CROSS REFERENCE TO RELATED APPLICATIONS

The present application is a continuation-in-part of co-pending U.S. application Ser. No. 14/451,287 filed Aug. 4, 2014 and Ser. No. 13/843,625 filed Mar. 15, 2013. The specification incorporates by reference the disclosure of German priority document DE 101 50 180.3 filed Oct. 12, 2001, U.S. Pat. No. 7,497,421, and U.S. Pat. No. 6,769,673.

BACKGROUND OF THE INVENTION

The present invention relates generally to aeration assemblies that are utilized in the gasification of liquids, especially for the aeration of water. In particular, the present invention relates to a dual control lateral air manifold assembly for use in water treatment applications that provide improved efficiency and lower costs.

Activated sludge systems are used to break down organic solids in wastewater by aerobic digestion from microorganisms (biomass). The organisms are then recycled and the remaining products are treated water and waste solids. Carbonaceous Biochemical Oxygen Demand (CBOD) is the amount of carbon-based organic matter in the water that is biodegradable. It is measured as Biochemical Oxygen Demand (BOD). Since this organic matter depletes oxygen in the water, the goal is to remove the organic solids in the water and lower the BOD level. This is also known as BOD removal. The level of BOD is controlled so that the final decanted water can be released into streams or rivers.

The basic equation for treating BOD with the activated sludge process is $BOD+O_2+Bacteria \rightarrow CO_2+H_2O$ ($BOD+Oxygen \rightarrow Carbon\ Dioxide+Water$).

Since the microorganisms use oxygen to break down the suspended solids (SS), oxygen must be introduced into the mixture of water and solids. This mixture is called Mixed Liquor Suspended Solids (MLSS). The amount of oxygen must be great enough for the biomass to break down the solids in the resident time in the waste tank. In order to maximize the amount of oxygen that is dissolved in the water (DO), the oxygen transfer efficiency (OTE) is examined. The more oxygen, the better the biomass can feed and maintain the proper biomass to solids ratio (F:M). The organisms and solids form into an aggregate called floc.

Biological nutrient remove is also a part of the activated sludge process, since nitrogen and phosphorus are elements which can promote the growth of noxious algae in surface waters that received treated waste water. Another demand of oxygen in an activated sludge process is created by oxidizing ammonia to nitrates (nitrification). Nitrification in aerated/aerobic zones or process phases involves the general formula:

Sequence 1: Bacteria Oxidize Ammonia to Nitride while Consuming Oxygen

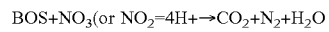

Sequence 2: Bacteria Oxidize Nitrite to Nitrate:

$2NO_2+O_2 \rightarrow 2NO_3$

De-nitrification occurs in a non-aerated/anoxic zone or SBR (Sequencing Bath Reactor) sequence. The nitrate ($NO_3$) from the nitrification zone/sequence is fed back to and mixed with the activated sludge aerobic zone/SBR sequence.

The base equation for de-nitrification is as follows:

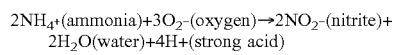

Phosphorus (P) removal involves an anaerobic zone/sequence→aerobic zone/sequence.

Various types of water-treatment apparatus have been developed and are used, for example, in clarification plants/waste water-processing aerobic digestion tanks. In a typical system, a plurality of aeration elements are disposed on a distribution conduit, whereby the distribution conduit on the one hand serves for the supply of air or gas to the aeration elements, and on the other hand also serves for the securement of the aeration elements. A plurality of distribution conduits can in turn be combined to form a system.

U.S. Pat. No. 5,015,421 to Messner describes a diffusion device that uses a flexible membrane on a rigid, plate-like aeration support element. Due to the structure of the rigid plate that serves as a substrate for the flexible membrane, when the aerating gas bubbles are released through openings provided in the membrane, or when the flow of aerating gas is stopped, the membrane can crease or wrinkle at specific points along the supporting plate, thus causing fatigue and wear at these points and reduced longevity of the aeration element.

An elongated aeration element is disclosed in DE 33 19 161A1. In addition, DE 36 00 234 discloses an apparatus for the aeration of water, according to which individual aeration elements are connected with the distribution conduit via fittings that during assembly are pressed into a bore in the distribution conduit accompanied by elastic deformation, thereby forming a positive connection. However, the aeration elements are plate-shaped elements. Such a connection is not suitable for elongated aeration elements, which can have an aeration length of up to and greater than one meter. When the apparatus moves or if there are flows in the liquid that is to be aerated, the long aeration elements act like lever arms, so that the forces that occur at the connection locations are much greater than is the case with plate-shaped aeration elements.

U.S. Pat. No. 7,497,421 (U.S. '421) by the same inventor describes an apparatus for gasification of liquids, the disclosure of which is incorporated herein by reference. U.S. '421 describes a device in which compressed gas is introduced into a tubular aeration element made up of rigid support tube with a lengthwise, rounded groove and a flexible membrane disposed around the tube. The gas escapes via slits in the membrane. A specialized fitting is provided for attaching the aeration element to a distribution conduit. The tubular aeration element, however, is limited in its aerating efficiency, due to the limited cross sectional area provided for releasing the aerating gas and bubbles into the surrounding volume of liquid.

None of the above art provides an elongated, flattened aeration element with an oval cross section and increased surface area efficiency, which is specifically designed to allow a flexible, inflatable membrane placed around a support member to expand and collapse during operation without fatigue, wear, and a shortened longevity of the aeration element components.

Further, none of the above cited art provides a means for preventing sludge or other particles from entering the interior of the aeration element during use, which can impair or completely inhibit functioning. This can occur if there is a breach of the membrane by an external impact of a sharp object or debris in the surrounding liquid. A backflow of particles or sludge is inhibited by the fine slits of the perforated membrane, acting as check valves in a deflated state of the membrane.

SUMMARY OF THE INVENTION

It is therefore an object of the present invention to provide a more efficient aeration element that has a greater cross sectional area available, that offers greater longevity and resilience, and which is capable of being mounted in new or existing aeration systems in a variety of configurations.

It is a further object of the present invention to provide an air control aeration element assembly, which utilizes more than one air control mechanism, which allows a more efficient, space saving arrangement of the aeration elements and provides substantial cost savings for water treatment facilities It is a further object of the present invention to provide a coupling device that is configured to couple the aeration elements to the air distribution conduits and which further are configured to couple at least two aeration elements in a dual air control aeration element assembly.

The object of the present invention is realized with a flattened, elongated aeration element having support member with a substantially oval cross-section, an elastomeric and flexible tubular membrane having air slits provided only on a top surface of the aeration element when the membrane is placed around the aeration element, and an air inlet with a threaded connection to connection the aeration element to a distribution conduit that serves for the supply of gas or air.

The support member of the aeration element is made up of a rigid, hard plastic material having a corrugated, hollow profiled and with corrugated outer surfaces, such that a plurality of grooves are formed between the ridges of the corrugated surfaces, both on the inner and outer surfaces of the support member.

The aeration element is provided with a clamp for retaining in place the membrane and further, the support includes a machine bead to prevent the clamp from slipping and to maintain the membrane under an axial, lengthwise tension, thereby preventing the membrane from slipping off the support member during use.

The aeration element can be provided with a check valve in the form of an opening in the upper surface of support member and an optional, second port on the bottom surface for condensation water purge. The check valve works in cooperation with a flexible, elastomeric membrane or flap to perform a back flow or check valve function that presents sludge and other materials, in the event the membrane was accidentally breached, or cut by an hard object floating in the sludge or during assembly of the system or operators servicing the system. However, liquid from condensation or backflow through the membrane is prevented from entering into the air supply system when the air is shut off during a intermittent cycle for de-nitrification and/or an anaerobic phase of the operating batch cycle of the biological processes sequence.

The aeration element further is provided with a mounting or support bracket for supporting or fixing in position the end(s) of the elongated aeration element when in use in an aeration system in a clarification tank or pool/pond, for example, by securing the mounting or support bracket to a floor or other surface of the tank or pool.

Pursuant to a particularly advantageous embodiment of the invention, aeration elements are respectively disposed in pairs on opposite locations on the distribution conduit, whereby in a given cross-sectional plane, the distribution conduit is provided at two oppositely disposed locations with bores through which a single bolt passes that connects the two aeration elements with one another. In this way, the support of the bolt relative to the wall of the distribution conduit is effected by the respective other aeration element. The aeration elements thus reciprocally support one another, and the apparatus can make do with a minimum number of parts.

It is also contemplated that the two head pieces of the aeration elements are pressed into the extruded profiled secured with a rubber liner or friction gasket, rather than using screws or bolts to secure the assembly.

The head piece's conical section, or wedge, protrudes into a friction gasket, whose inside contour is funnel-shaped. By pressing in the wedge-shaped section of the head piece, the friction gasket expands outwards against the inner contour of the hollow corrugated hard plastic extrusion, forms a seal and fastens the head pieces securely into the corrugated extrusion pieces. The high friction (coefficient) and the expansion of the rubber gasket/friction assembly mount prevent the assembly from coming apart again.

The head piece and corrugated profile can also alternatively be fused together by gluing, welding, friction welding and over-molding.

The aeration elements also can be secured in place by means of an assembly bracket having cooperating upper and lower profiled portions that can be secured around the aeration element. The assembly bracket is in turn secured to the floor by either an anchor bolt in the center bottom hole directly into the tank floor or by two height-adjustable anchors through the two outer holes to enable leveling of the diffuser to bottom of the tank for maintaining the position of an aeration element. It is contemplated that a plurality of brackets can be utilized along the length of the aeration element, rather than only on its ends.

In a further embodiment, in view of transport and assembly considerations, aeration elements having shorter lengths are contemplated. Two of these shorter aeration elements can be connected at their adjacent ends, when the aeration elements are placed adjacent one another, a connection line, such that one aeration element function as an air conduit to one or more aeration elements. With this configuration, buoyancy of the aeration elements is reduced. Shorter length modules of aeration elements can more easily be transported, handled and installed.

It is further contemplated according to the present invention that the aeration elements are included as a component of a dual air control lateral air manifold assembly. The assembly preferably includes at least two aeration elements, a plurality of support or mounting brackets for securing the aeration elements to a support surface, at least two air conduits; a conduit mounting assembly with conduit mounting clamps; and at least two coupling devices configured to connect the aeration elements to the at least two air supply conduits.

Preferably, the dual air control lateral air manifold assembly includes at least two offset, stacked conduit elements arranged within a single conduit mounting assembly in order to provide a cost-effective and space-saving arrangement of the air supply conduits relative to the aeration elements. The assembly provides a high efficiency fine bubble aeration of the water to be treated, in combination with low power consumption supplemental mixing with submerged or floating mixers.

Preferably, only one lateral air supply conduit is used with the conduit mounting assembly and coupling devices according to the present invention.

The dual control lateral air manifold assembly is contemplated for use in aeration tank applications, such as class activated sludge flow through, tapered aeration zone and Sequencing Batch Reactor (SBR) designs. Further, the assembly can be used in oxidation ditch applications, including upgrades and retrofits and provide up to a 50% energy savings of mechanical mixing aerators. A further advantage relates to the energy efficient loading scalability by combining high efficiency fine bubble aeration with low energy consumption submerged mixing.

As noted above, a significant advantage associated with the dual control lateral air manifold assembly is its flexibility and scalability with regard to its applications in water treatment facilities. The present invention, as opposed to any aeration systems presently known in the art, provides the broadest BOD and hydraulic flow load range variability to address the current environmental volatility caused by extreme weather events such as drought or heavy rains, demographic, industrial product shifts, and other factors over the yours of a 15 to 25 year municipal and/or industrial waste water treatment infrastructure planning cycle.

Further specific features of the invention will be described in detail subsequently.

BRIEF DESCRIPTION OF THE DRAWINGS

This object, and other objects and advantages of the present invention, will appear more clearly from the following specification in conjunction with the accompanying schematic drawings, in which:

FIGS. 11A-11C are side, top, and cross sectional view, respectively, of the mounting assembly of FIG. 11;

FIG. 12 is a further cross sectional view of the mounting assembly of FIG. 11;

FIGS. 12A-12B are plan view of the mounting assembly of FIG. 11 and showing the threaded hose coupling and flexible hose connected thereto;

FIGS. 13A-13C shows further details of the mounting bracket assembly of FIG. 13;

FIGS. 14-14B show further plan views of the mounting bracket assembly with a threaded hose coupling;

FIGS. 16B and 16C show perspective views of a plurality of assembly brackets assemblies arranged on the length of two forms of aeration elements and attached to the support surface;

FIGS. 17-17B show top, side, and end views, respectively, of the mounting bracket assembly of FIGS. 15 and 15A secured to the support surface;

FIGS. 24 and 24A show view of the coupling device according to the present invention;

FIGS. 27 and 27A show views of a mounting bracket assembly for use with the coupling device and dual air control assembly according to the present invention.

DESCRIPTION OF PREFERRED EMBODIMENTS

Figure 1:
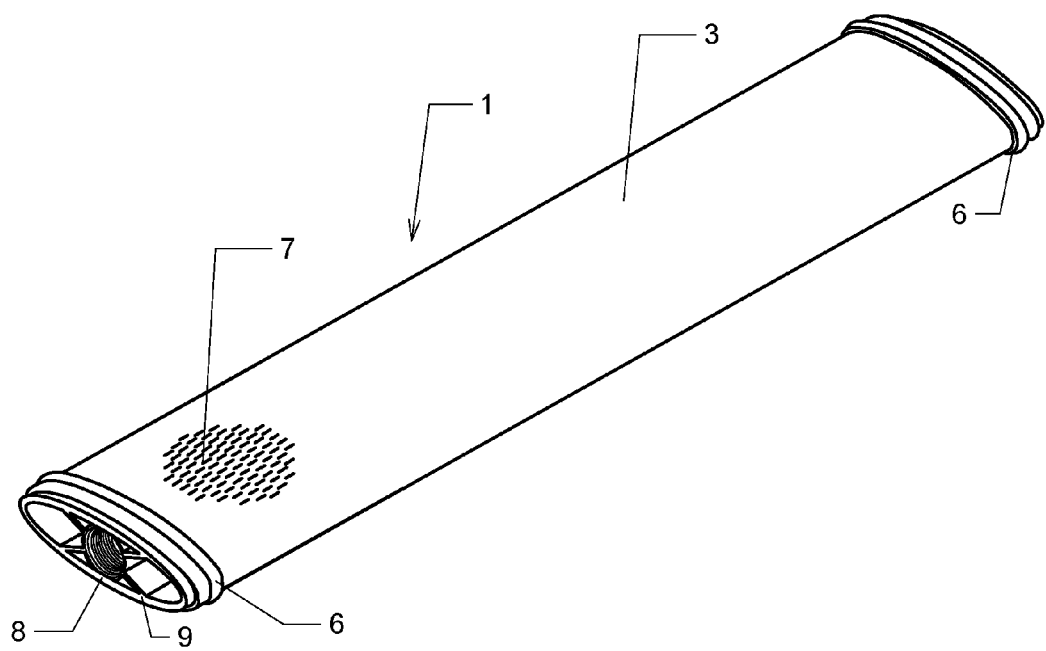
FIG. 1 shows a plan view of the inventive aeration element.
Figure 2:
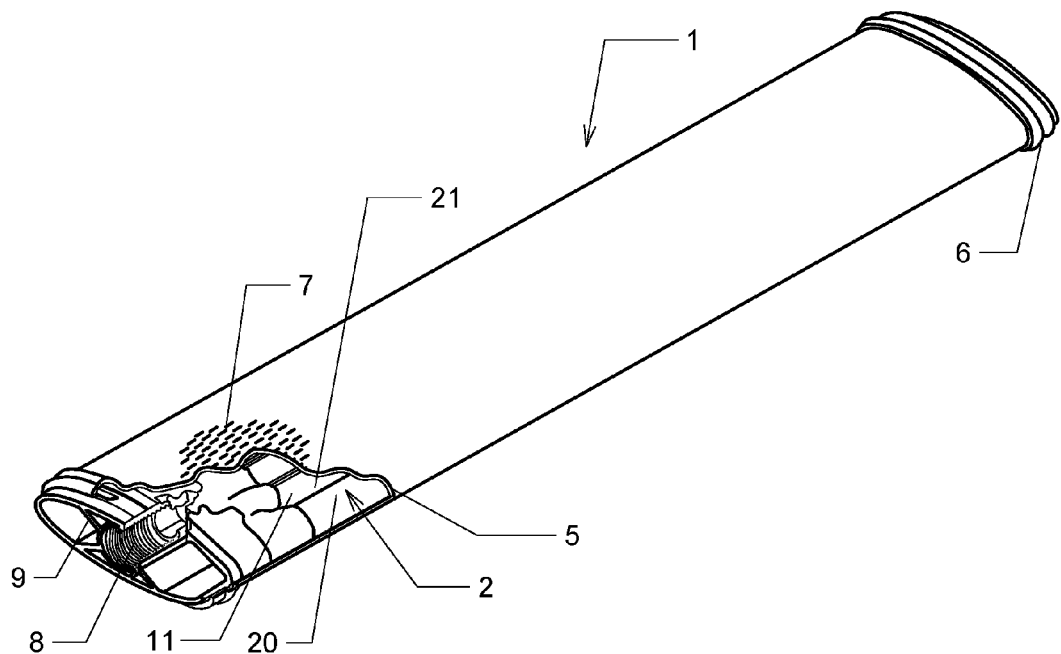
FIG. 2 is a plan view of the aeration element with a cutaway of the outer membrane.

Referring now to the drawings in detail, in particular FIGS. 1 and 2, the elongated, flattened diffuser aeration element 1 of the present invention has an essentially flattened, rigid support element 2 with an essentially oval cross-section. As can be seen in FIG. 2, the support element 2 with the oval cross-section has a hard, rigid corrugated hollow profile 11, such that opposite surfaces 3, 4 (upper and lower surfaces, respectively as shown in FIGS. 1 and 2) of the support element provided corrugated surfaces with raised portions or ridges 20 and channels or grooves 21 disposed therebetween.

A sleeve 5, or flexible membrane, is disposed about the support element 2 and secured around at least one end of the support element 2 by a clamp 6 made of stainless steel or another material, which is positioned to hold the sleeve 5 in place in an airtight manner against the support element 2. The sleeve 5 includes perforations in the form of slits 7 which are positioned only on the upper surface 3 of the support element 2 when the sleeve 5 is in place around the support element 5. The sleeve 5 preferably is made of a material such as EPDM, silicone, polyurethane, polymeric thermoset, and thermoplastic elastomers.

Figure 3:
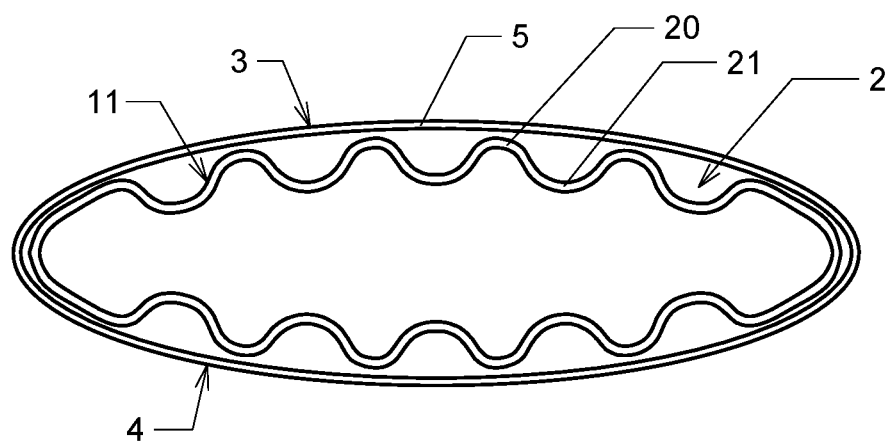
FIG. 3 is a lengthwise cross-section of the aeration element of FIG. 1 with the flexible membrane disposed around it in an inflated state.
Figure 3A:
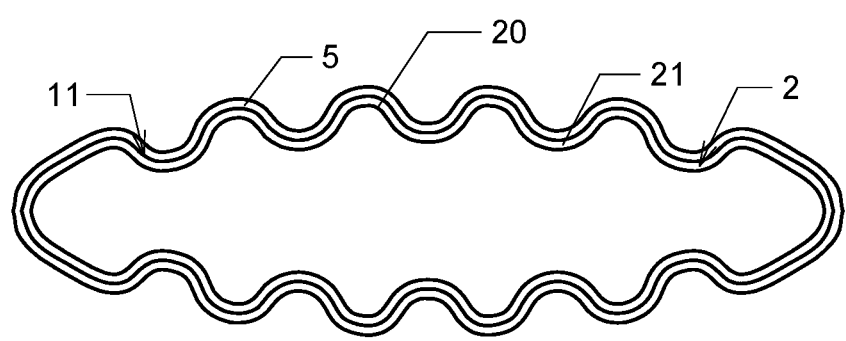
FIG. 3A is a lengthwise cross-section of the aeration element of FIG. 1 with the flexible membrane disposed around it in a deflated state.
Figure 7:
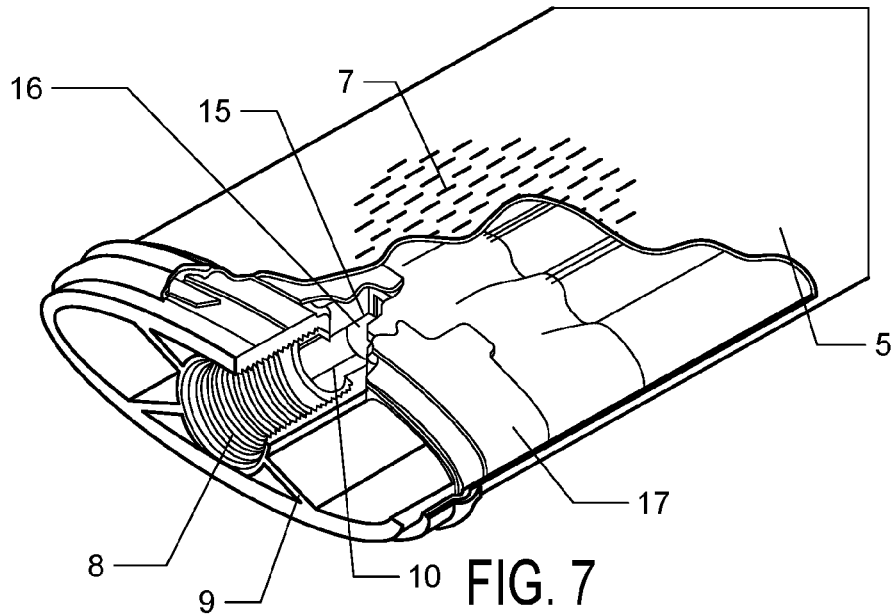
FIG. 7 is a further view of the connecting end of the aeration element with the check valve band/flap and outer membrane shown cut away to expose the air supply hole connected with the threaded air port connection.

The aeration element 1 further includes a threaded air port connection 8 for attachment to an air supply with a cooperating fitting, such as an air distribution conduit, as will be described below. Radial ribs 9 extend outwardly from the connection 9 to define opening channels and structural support for the open end of the support element 2. As shown in FIG. 7, the threaded air port connection 8 is connected to an air supply hole 10 in the support element 2, through which air supplied into the aeration element 1 flows into the support element 2. As shown in FIGS. 3 and 3A, the air supply flows between the corrugated profile 11 and the sleeve 5, causing the sleeve 5 to inflate; the air is released from the sleeve 5 into the surrounding liquid via the slits 7 formed in the sleeve 5 on the top or upper surface of the support element 2.

FIG. 3A shows the sleeve 5 in a deflated or collapsed state, in which the sleeve 5 falls onto the corrugated profile 11; this allows for a controlled radius or folding of the sleeve 5. Further, the ridges 20 and grooves 21 prevent the sleeve 5 from forming creases in the de-pressurized state thereby extending the life expectancy of the unit. During operation, the center or interior of the support element 2 is filled with water and/or sludge when the aeration element 1 is submerged.

It is further contemplated that the one end of a first diffuser can be closed off with an optional threaded port to supply a second diffuser with air, using the first diffuser as an air conduit. The diffuser is still fully buoyant. In other words, the second diffuser need not be connected with the main air supply, but only to the first diffuser.

The inventive structure of the aeration element 1 provides for a reduced buoyancy of the aeration element in this submerged state. When the sleeve 5 is inflated, it expands to a cylindrical form such that corrugated profile (i.e., the ridges 20 and grooves 21) may not be evident. It has been found, surprisingly, that the invention works best when the inside circumference of sleeve 5 is equal to the outside circumference of the surface of support element 2, whether the sleeve 5 is in its inflated or non-inflated state.

Figure 4:
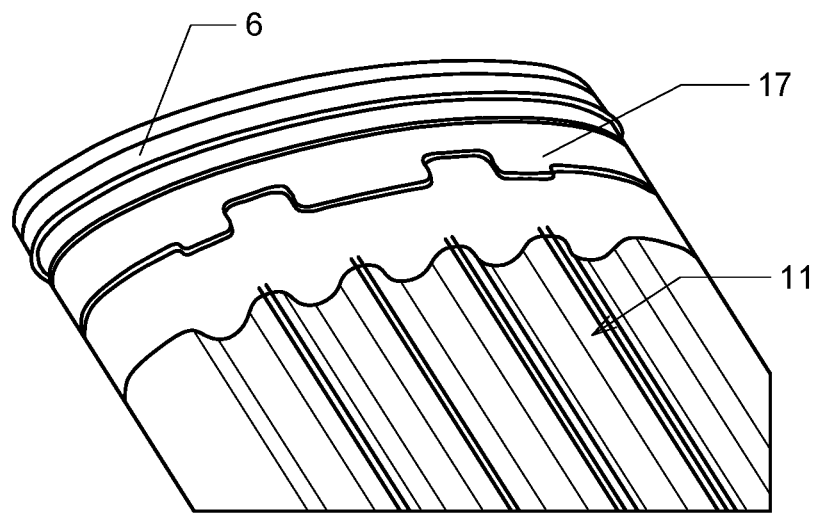
FIG. 4 is an top view of aeration element showing the retaining clamp and check valve with flexible band in place.

As shown in FIG. 4, the support element 2 includes profiled transitions or stepping 14 such that the inner diameter circumference of the sleeve 5 is equivalent to the outer diameter circumference of the corrugated profile 11 of the support element 2.

Figure 5:
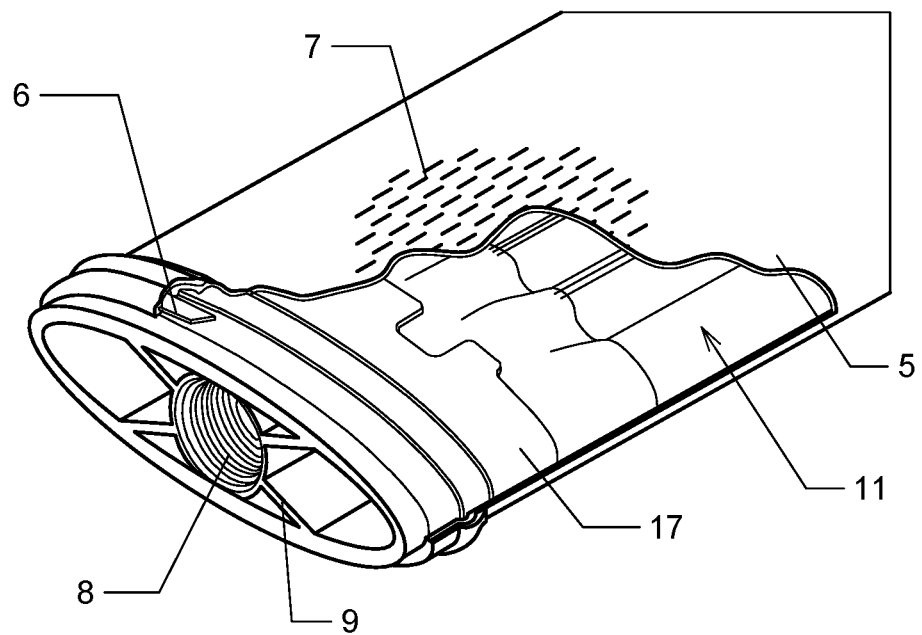
FIG. 5 is a view of the connecting end of the aeration element with the flexible membrane in a cutaway view to expose the check valve band and corrugated surface of the aeration element of FIG. 1.

FIG. 5 shows the aeration element 1 with the outer sleeve 5 cut away to reveal the support element 2 and its corrugated profile 11. The aeration element 1, in a preferred embodiment, includes a check or backflow valve assembly 15. The check valve assembly 15 includes an opening 16 and flexible, elastomeric band 17 positioned around the support element 2 to cover the opening 16 during operation of the aeration element 1. The band 17 preferably includes cut-out portions to assist in distribution air flow into the interior of the support element 2. The band or flap 17 is positioned to cover the opening 16 to prevent the debris from entering the interior of the aeration element 1 and impairing its operation, if a backflow of sludge or other debris should occur when the membrane sleeve 5 is breached or cut by external impact of debris floating in the sludge, or when the sleeve 5 is damaged externally during installation or servicing of the aeration system. To accommodate the band 17 and retain a uniform outer circumference of the support element 2, a portion of the material of the support 2 is removed from the support element 2 to form a recessed area 18 for the band 17, as can be seen from FIGS. 6 and 6A.

Figure 6:
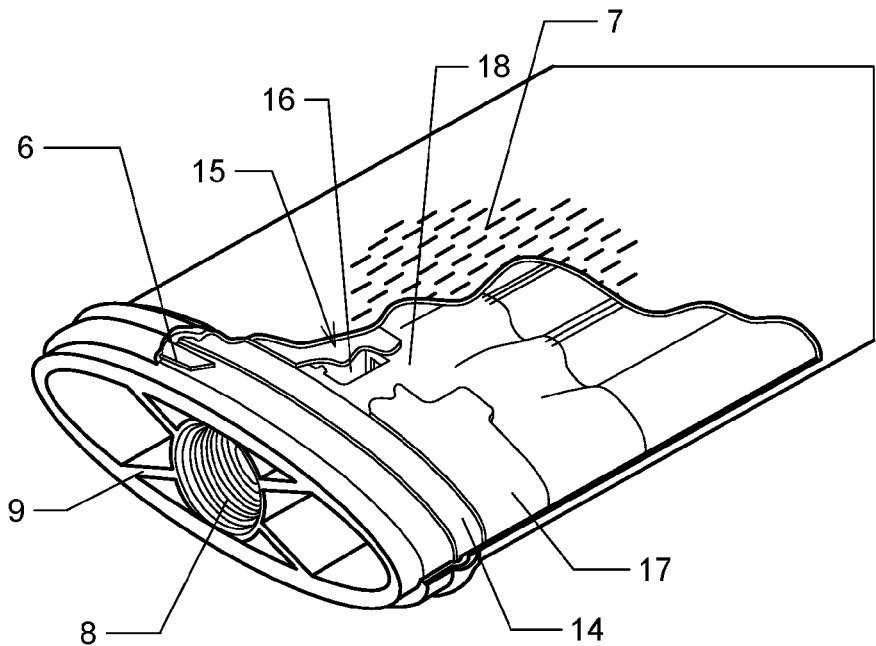
FIG. 6 shows a further view of the connecting end of the aeration element with the check valve band/flap cut away to expose the check valve opening.
Figure 6A:
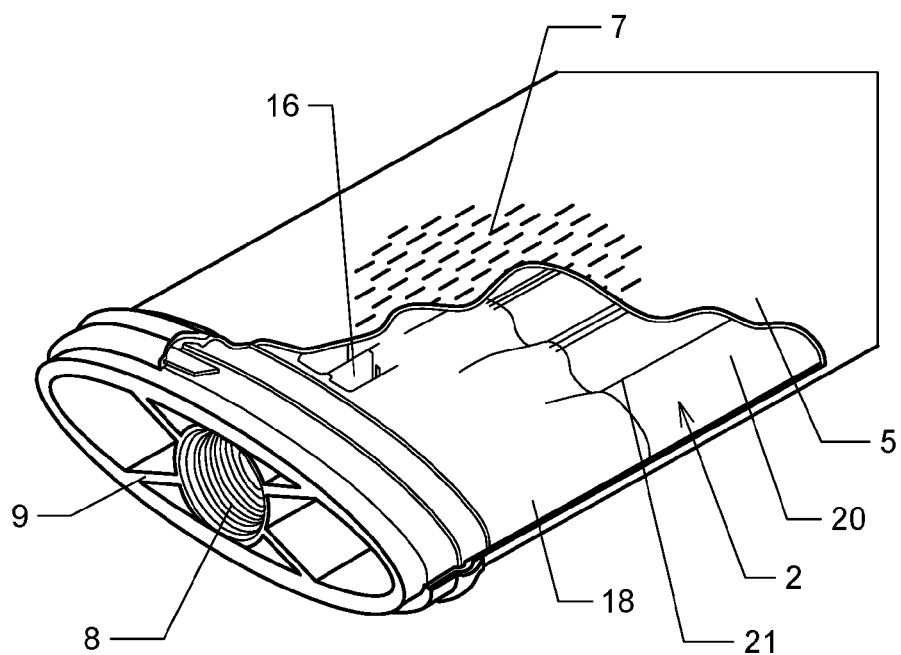
FIG. 6A shows a further view of the connecting end of the aeration element with the check valve band/flap completed removed.

FIGS. 6 and 6A show further details of the check or backflow valve assembly 16. In FIG. 6, the band 17 is shown partially cut away to expose the opening 16, while FIG. 6A shows the band 17 completely removed.

Figure 8:
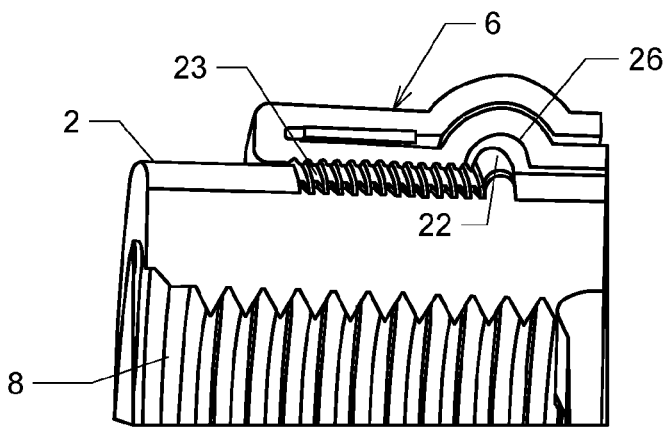
FIGS. 8 and 8A are detail views of the bead and grip ridges formed on the support member to prevent slippage of the clamp and membrane.
Figure 8A:
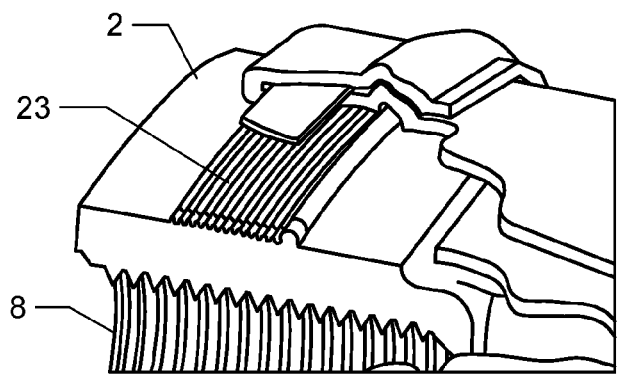

FIG. 8 shows a detail of the clamp 6, which is made of stainless steel or another material, and which is positioned near the ends of the aeration element 1 to hold the sleeve 5 in place. Preferably, the support element 2 is provided with a bead 22 that cooperates with a recess 26 on the clamp 6 to prevent the clamp 6 from slipping and to keep the sleeve 5 under an axial and longitudinal tension, thereby preventing the sleeve 5 from slipping off the support element 2. Further, the support element 2 can be provided with grips or grooves 23 to improve the air seal function of the clamp 6, which further compresses the sleeve 5 onto the support element 2 (see also FIG. 8A).

Figure 9:
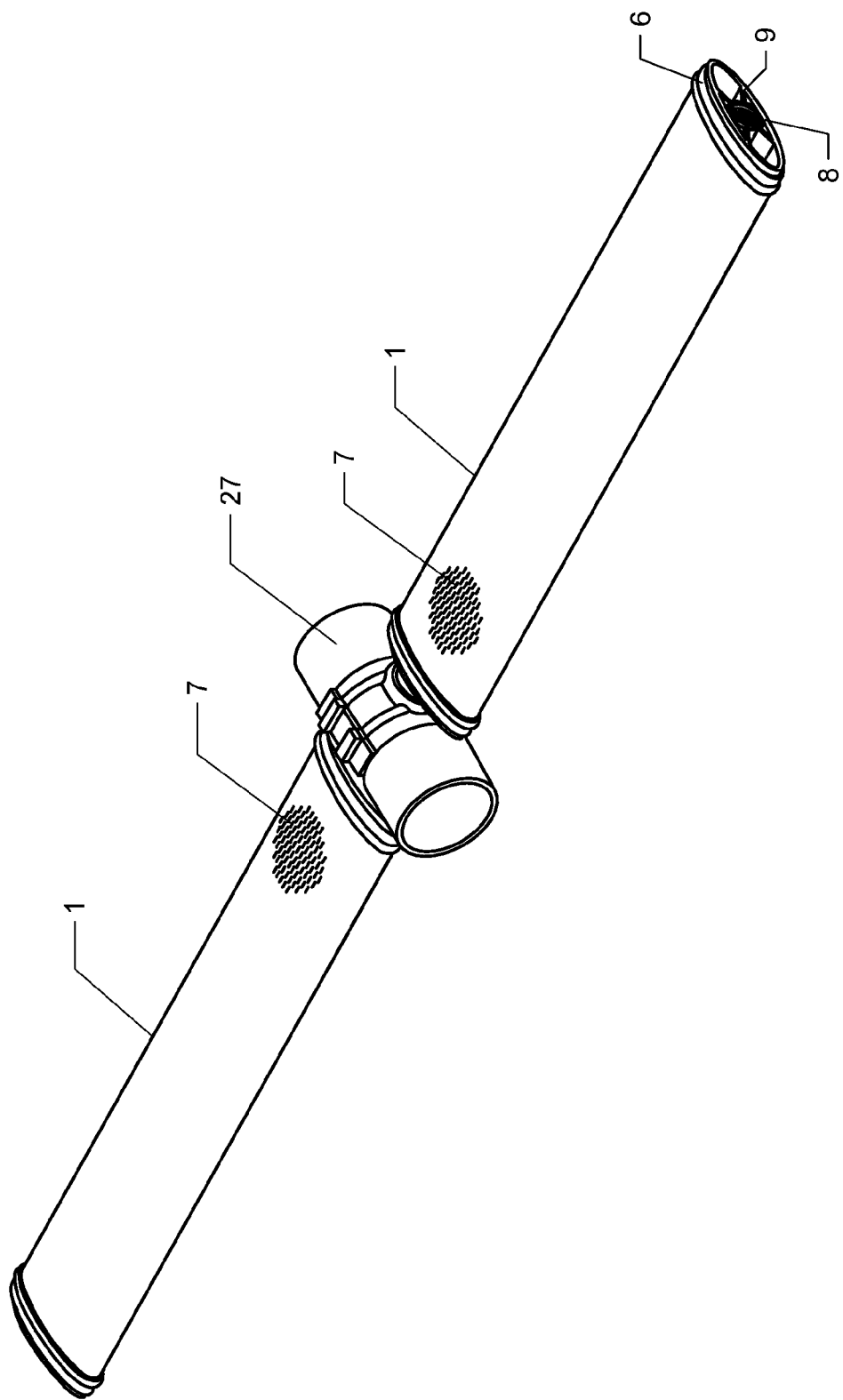
FIG. 9 is a plan view of two inventive aeration elements connected on opposite sides of a distribution conduit.

FIG. 9 shows two aeration elements 1 connected via the thread air port connection 8 to an air supply, shown here as distribution conduit 27. The air port connection 8 is configured to cooperate with a fitting to form a sealed connection to the distribution conduit 27, for example, a fitting like that disclosed in U.S. Pat. No. 7,497,421 to the same inventor, the subject matter of this patent being incorporated herein by reference. The aeration elements 1 extend perpendicular to the distribution conduit 27. The distribution conduit 27 can be equipped with a plurality of such pairs of aeration elements 1. The support element 2 is open at its ends, so that the water or other liquid that surround the aeration element has access to the interior of the support element 2. Sleeve 5, as discussed above is an elastic material, especially rubber or a rubber-like polymeric material that stretches around the surface of the flattened support element 2. When sleeve 5 is not inflated, hence when aeration is not occurring, sleeve 5 deforms to the curvatures of the surface of the flattened support element 2, but the corrugated, outside surface of support element 2 prevents crease formation in sleeve 5.

As a consequence of the above manner of construction, during operation only a small portion of the support element 2 is filled with air, and the buoyancy of the aeration element is therefore low, which is of particular advantage for very long aeration elements 1. The length of the aeration element 1 can be varied according to the application, that is, the size and volume of the area being aerated. With very long aeration elements, mounting assemblies may be utilized to fix the aeration elements to a bottom surface of the tank, pool, or other container to prevent vertical and lateral movement or buckling of the aeration elements 2 in the liquid.

Figure 21:
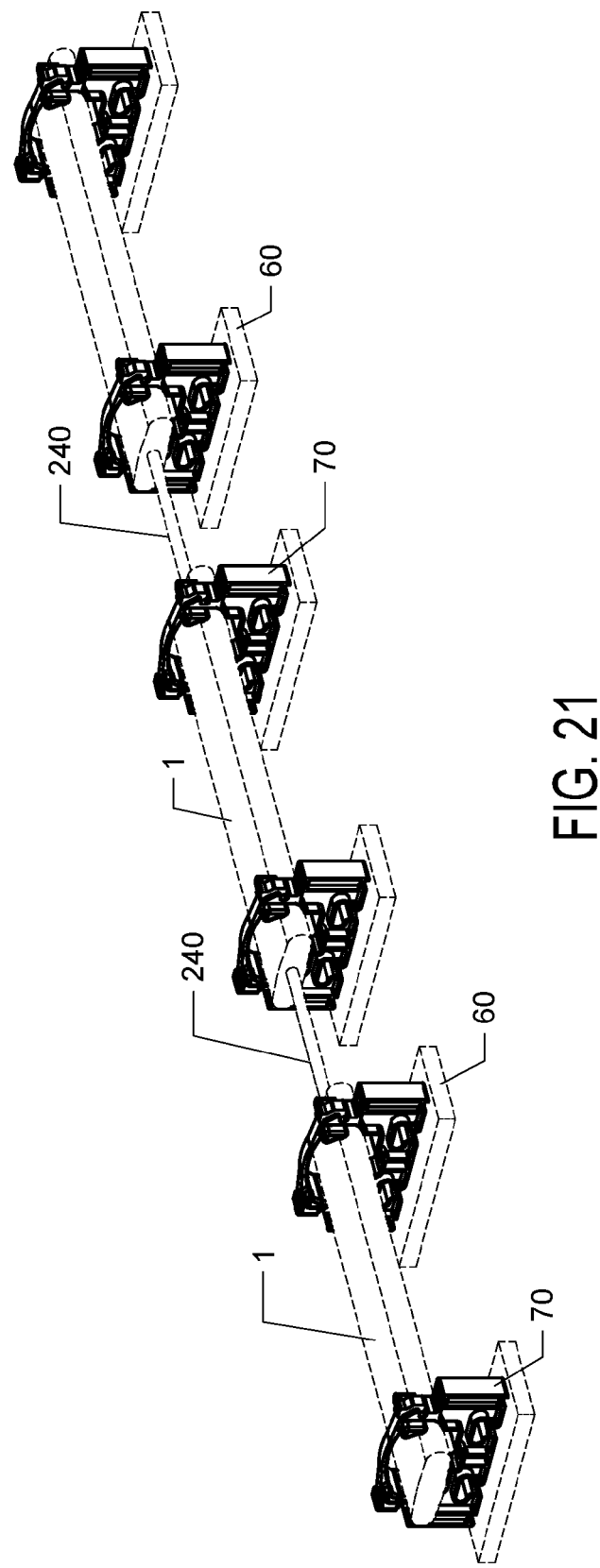
FIG. 21 shows a plan view of a series of diffusers that are connectable to a main air supply and which are connected to one another along the central axis of the diffusers.

As noted above, and as shown in FIG. 21, one end of a first aeration element can be closed off with an optional threaded port to supply a second diffuser with air, using the first diffuser as an air conduit. The aeration elements can then be connected in series as shown in FIG. 21.

Figure 9A:
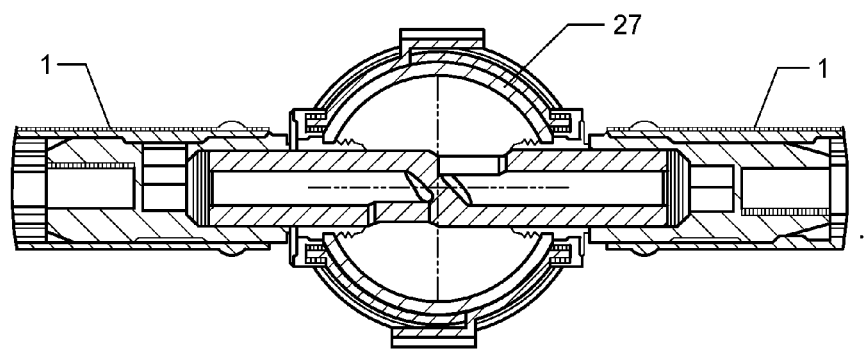
FIGS. 9A-9D are cross sectional and top views of the two aeration elements of FIG. 9 showing their connection and positioning relative to the distribution conduit, as well as an arrangement of a plurality of such pairs of aeration elements along a common distribution conduit.
Figure 9B:
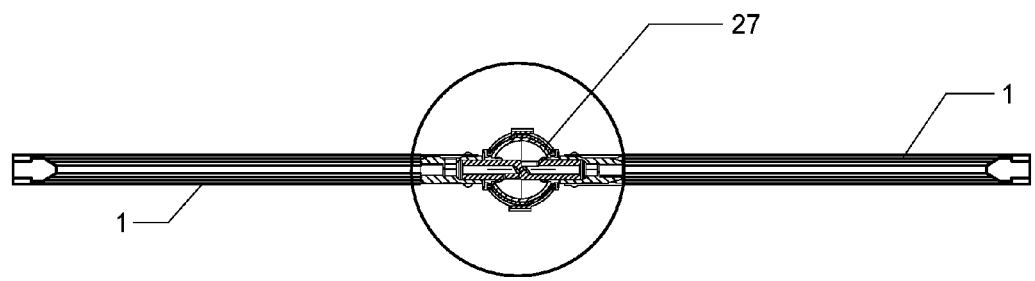
Figure 9C:
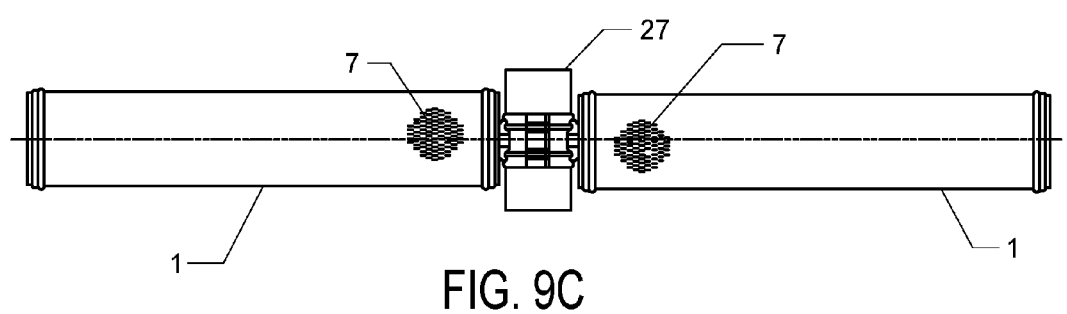

FIGS. 9A and 9B illustrate two aeration elements 2 connected to a distribution conduit 27 in cross sectional view, while FIG. 9C shows a top view of the aeration element 2 connected to the distribution conduit 27. While FIGS. 9A and 9B show two aeration elements 2, it is to be understood that any number of aeration elements (i.e., more than one) can be utilized. As can be seen in FIGS. 9 and 9C, the slits 7 are evenly distributed over the entire top surface 3 of the sleeve 5, although the figures show slits 7 positioned only on a portion of the top surface 3 of the sleeve 5. Air fed into the air port connection 8 can flow through the air supply hole 10 and escapes through the slits 7 as fine bubbles into the surrounding water or liquid.

Figure 9D:
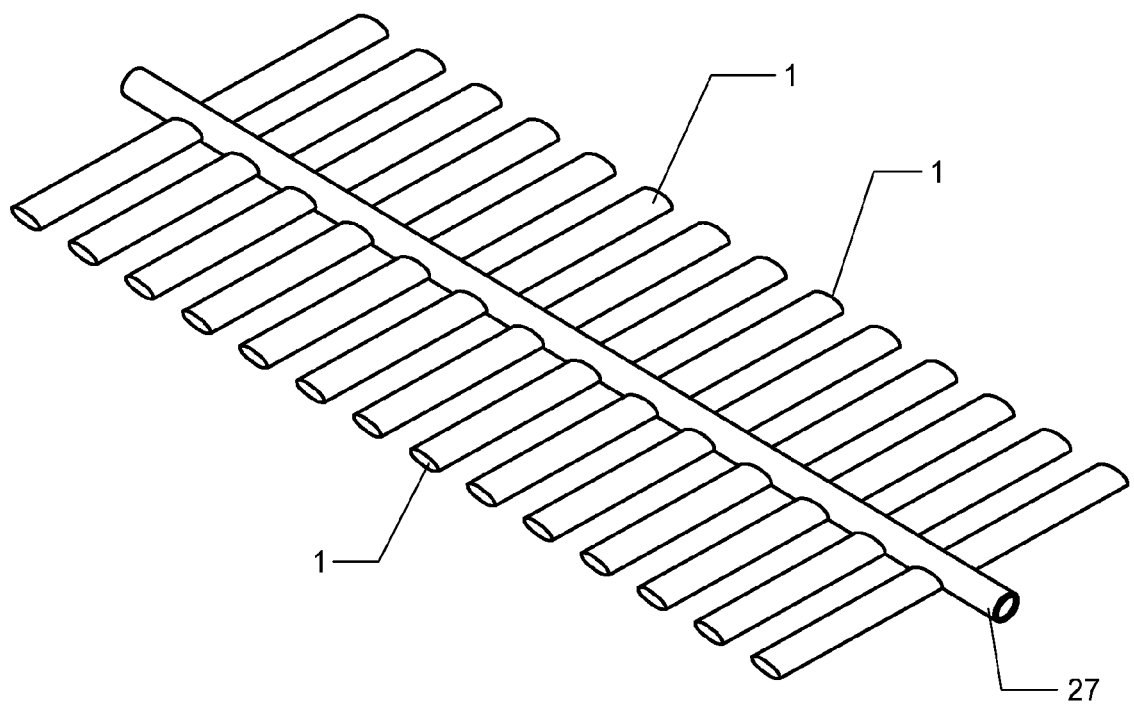

FIG. 9D shows a plurality of aeration elements 1 connected in the paired relationship of FIG. 9 along a common distribution channel 27. The aeration elements 1 can be spaced from one another, as shown in FIG. 9D, or arranged to be adjacent to one anther, as shown for example in FIG. 10.

Preferably, the connection of the aeration element 1 to an air distribution conduit 27 or other air supply or manifold is affected by connecting a cooperating, threaded fitting to form a sealed connection between the air port connection 8 and the air distribution manner by a fitting arrangement shown by way of example in FIGS. 9A through 9C.

Figure 10:
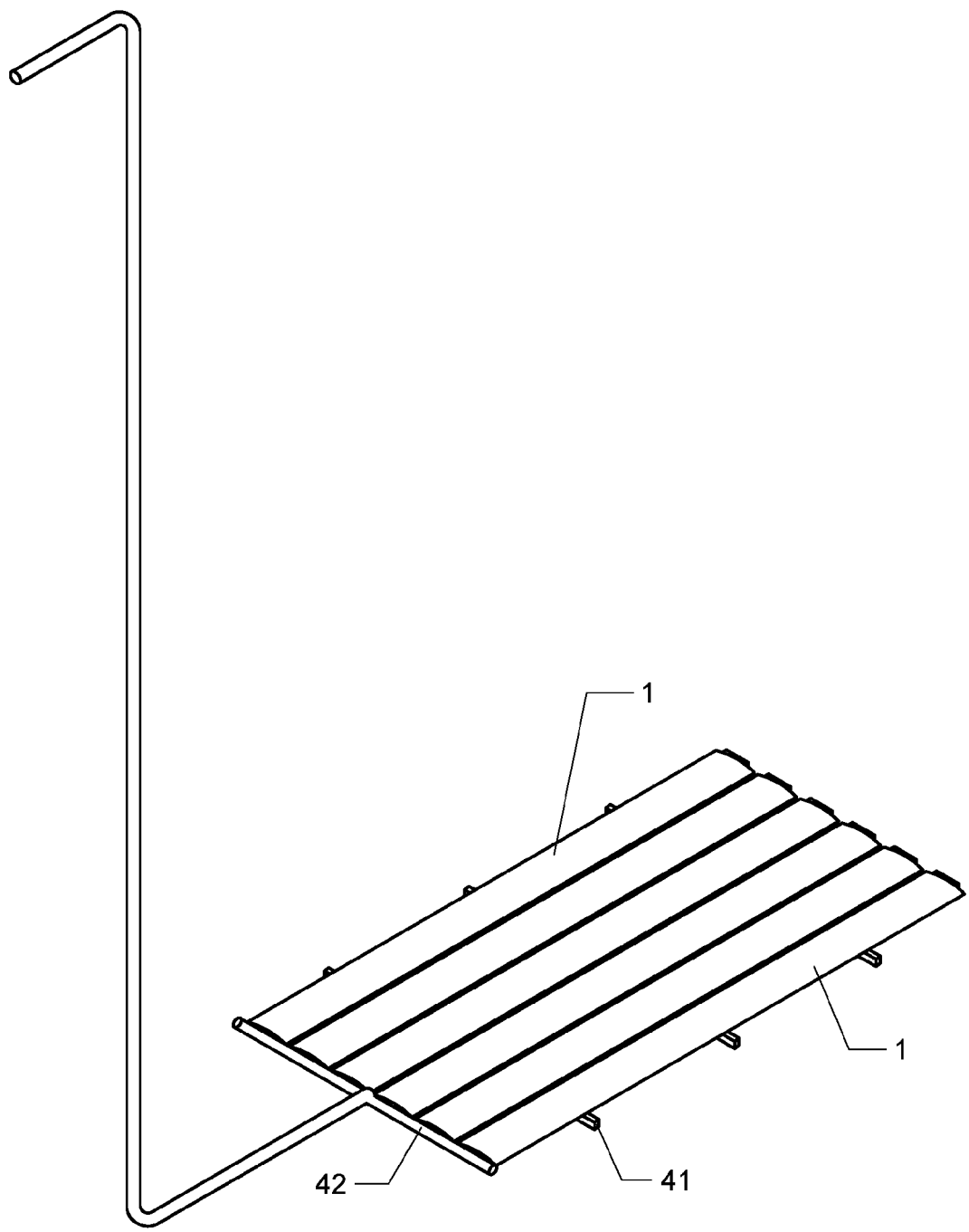
FIGS. 10-10B are plan views illustrating various embodiments for arranging a plurality of inventive aeration elements relative to a distribution conduit or other air supply device.

FIGS. 10 through 10D show a variety of contemplated configurations for arranging a plurality of the aeration elements 1 depending on the volume of liquid to be aerated and the other parameters of the specific application. As shown in FIG. 10, the aeration elements 1 can be arranged side to side on a base frame 41 or support structure and supplied with air via a common conduit 42 that, in turn, is supplied with air via a supply tube, pipe or hose.

Figure 10A:
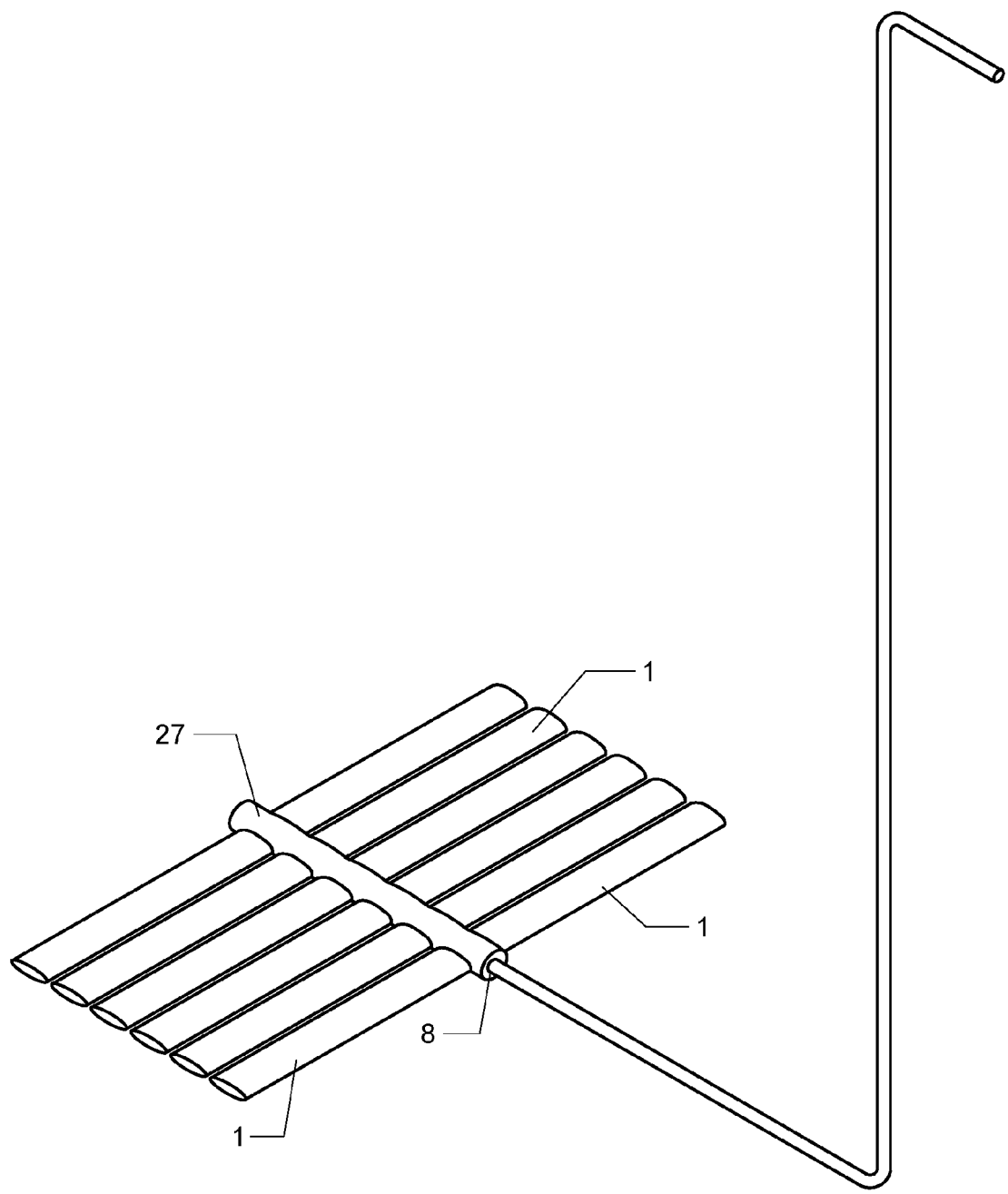

FIG. 10A shows another, possible configuration of the aeration elements 1, again, arranged side-by-side but connected to a distribution conduit 27 as shown in FIG. 9.

Figure 10B:
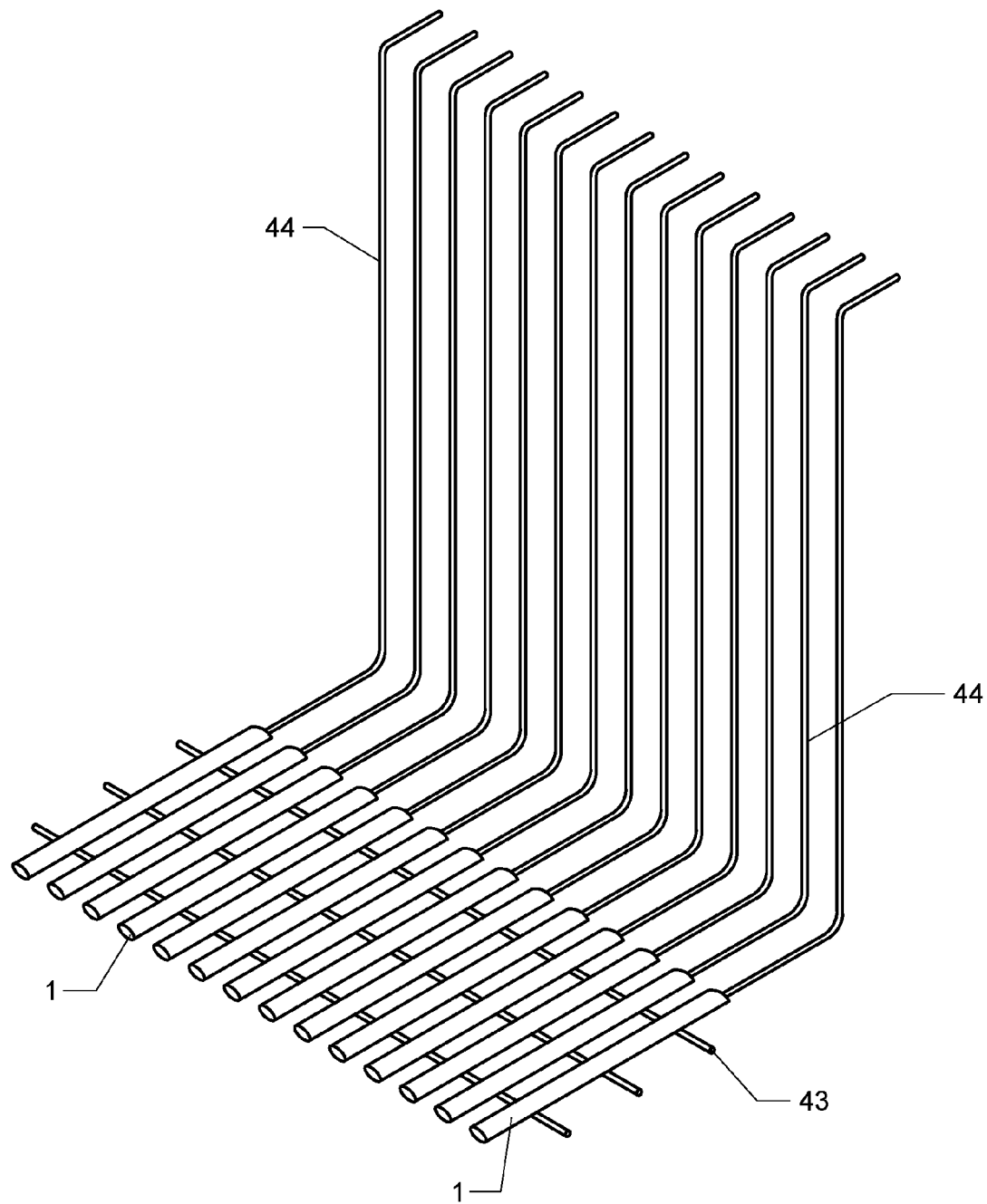

FIG. 10B shows a further configuration for the aeration elements 1, in which the elements 1 are arranged in a spaced relation on a framework or tracks 43, and with each aeration element having an individual air supply 44.

Due to the elongated nature of the aeration element 1 and in particular, when the application requires extremely long aeration elements 1, a mounting assembly may be provided to secure the aeration element(s) to a bottom surface of the container, pool, pond, etc. containing the water to be aerated. As noted above, the mounting device or bracket prevents vertical or lateral movement of the aeration element(s) 1 during use.

Figure 11:
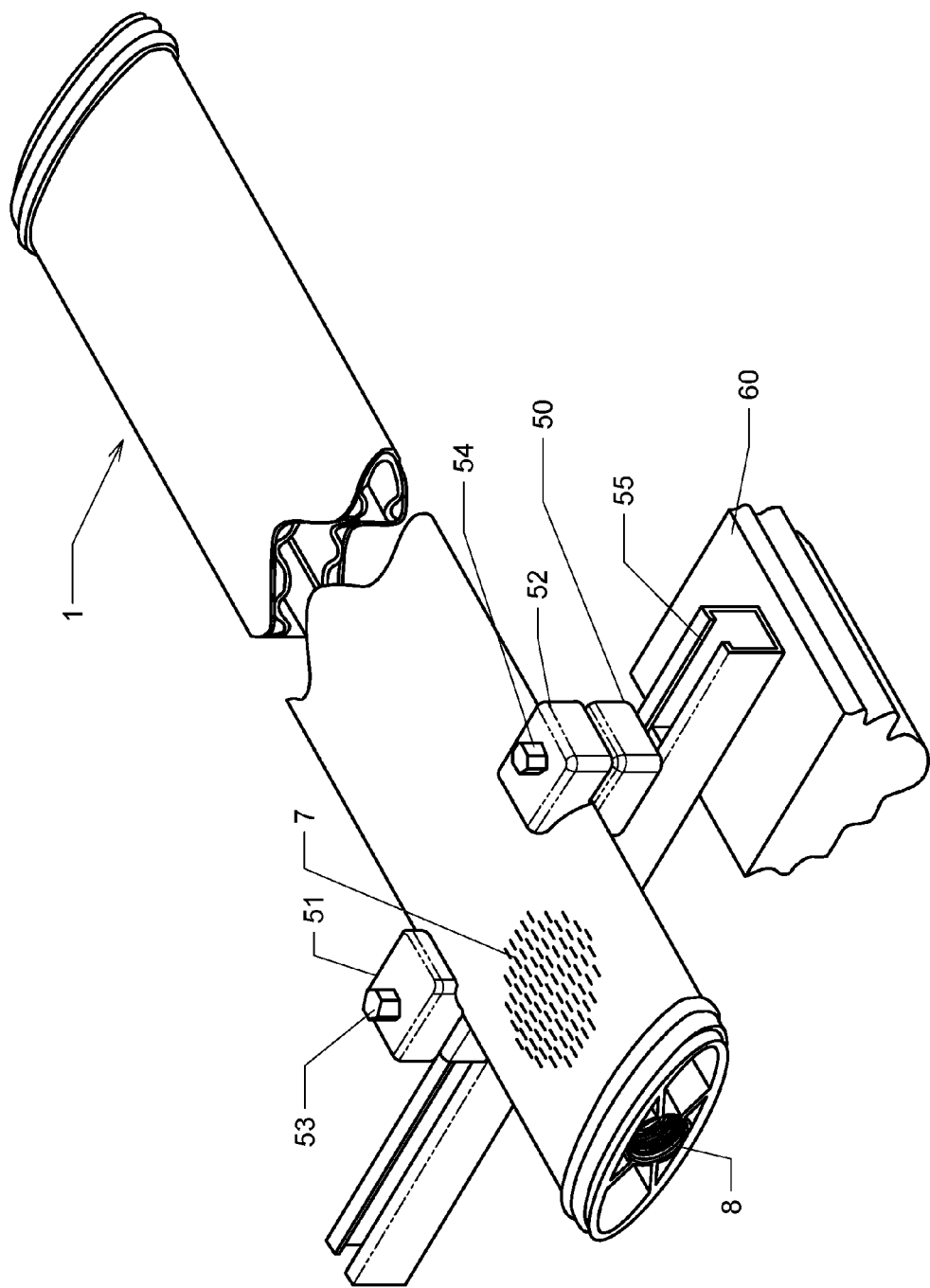
FIG. 11 is a plan view of an inventive aeration element positioned in a mounting assembly.

FIG. 11 shows an embodiment of a mounting assembly 50 for securing the aeration element 1 to the floor or bottom of the container or body of water to be aerated. The mounting assembly 50 includes flanges 51, 52 and respective cooperating bolts 53, 54 that received in a cooperating groove of a profiled bar 55. The aeration element 1 is positioned and clamped between the flanges 51, 52, and the profiled bar 55, in turn is attached via a pin or bolt 56 to the bottom surface 60 or floor of the container/body of water to be aerated.

FIG. 11A shows a side view of the mounting assembly 50, profiled bar 55, and securing bolt and nut assembly 56. FIG. 11B shows a top view of the mounting assembly 50 and aeration element 50, and FIG. 11C shows a cross sectional view mounting assembly 50 in place to hold the aeration element 1 in position as described above. Again, depending on the length of the aeration element(s) 1 and/or depth at which the aeration elements 1 are position, according to the specific application, one or more of such mounting assemblies 50 may be utilized to stabilize and secure the aeration elements 1.

Figure 13:
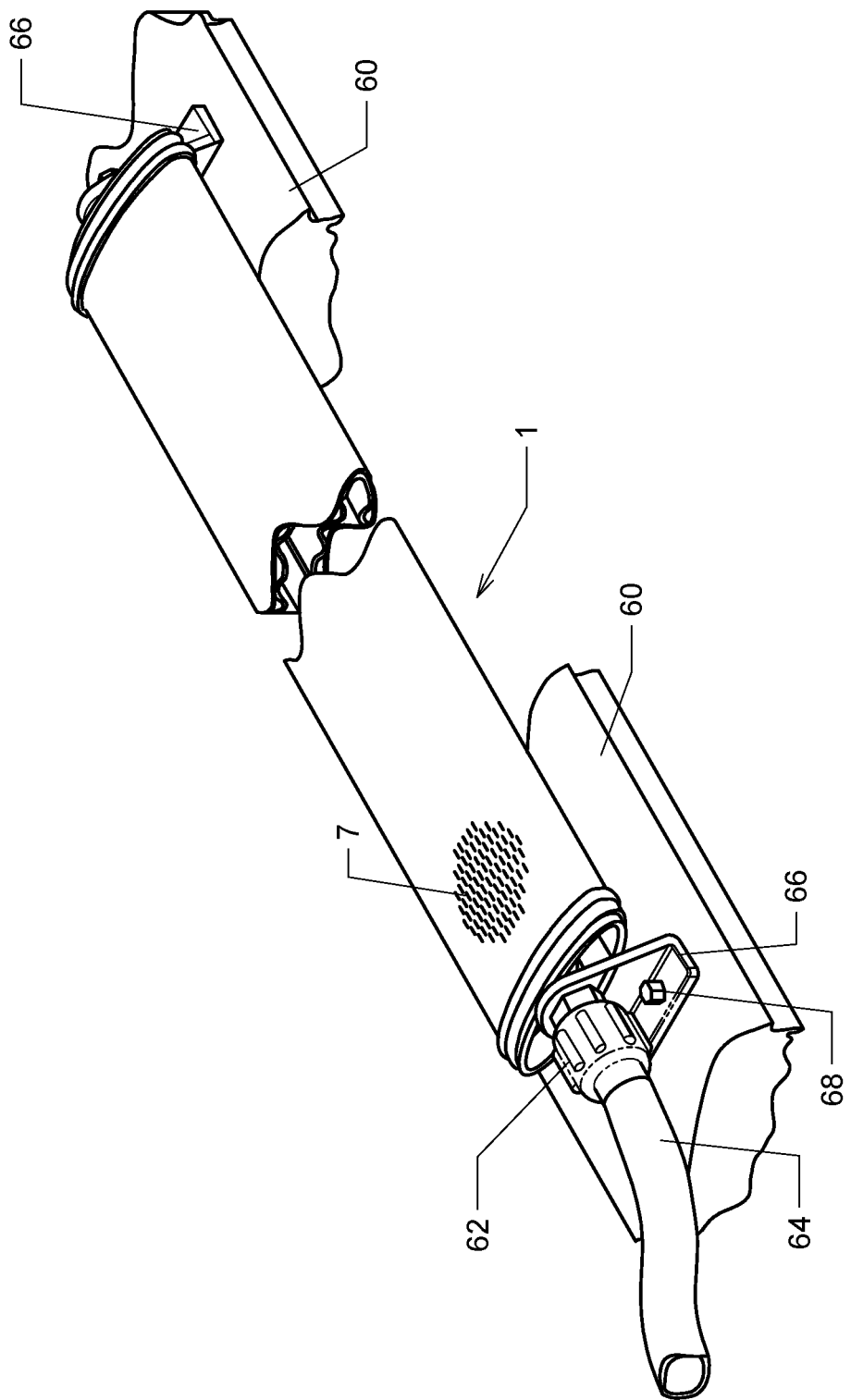
FIG. 13 is a plan view of a further embodiment of a mounting bracket assembly.

FIGS. 12, 12A and 12B show the mounting bracket assembly of FIG. 11. In this embodiment, a first type of coupling for connecting the aerator element 1 to an air supply is shown by way of example. A threaded adapter or coupling 61 for connecting any type of material hose using a band clamp is utilized in a commonly known manner, with the coupling 61 being received in the air port connection 8. FIGS. 13, 13A, 13B, and 13C show an embodiment of an adjustable mounting bracket 66 for securing one or both ends of the aeration element to the bottom or floor 60 of the tank containing the liquid to be aerated. The adjustable mounting bracket 66 can be cemented and secured by bolts 68 onto a concrete floor, for example. The bracket 66 includes a recess for accommodating a further bolt 69 that enables the height/position of the bracket 66 to be adjustable in order to level the aerator element 1. FIG. 13A shows a threaded hose coupling 62 as a second type of coupling that can be used to connect the aerator element 1 to an air supply, along with a flexible hose 64 that is connected to a cooperating threaded coupling received in the air port connection 9. FIG. 13B shows the end of the aeration element 1 (opposite the end of the aeration element 1 to which the hose 64 is connectable), likewise secured by the mounting bracket 66 to a bottom or floor 60 of the tank.

FIG. 13C shows a side view of the aeration element 1 with mounting brackets 66 securing it to the floor 60 at opposite ends and with a threaded hose coupling 62 and flexible hose 64 attached.

Figure 14:
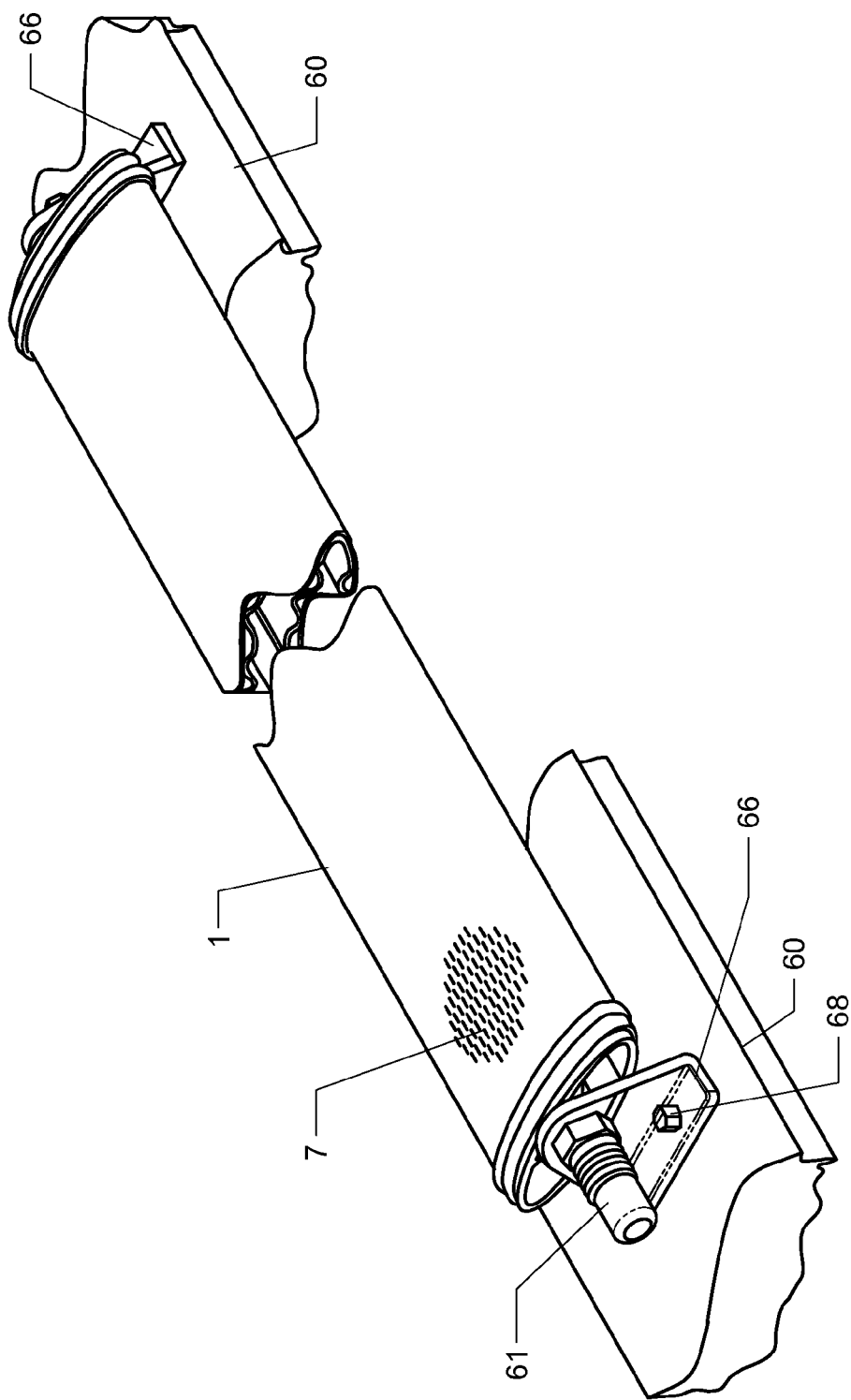

FIGS. 14 and 14A show the adjustable mounting bracket 66 again securing opposite ends of the aeration element 1 to the floor or bottom 60 of a tank, but illustrates also the threaded adapter or connection 61 provided to receive a threaded hose coupling 62 and flexible hose 64 for supply air to the device.

The above-described features of the inventive aeration element 1 provide for an improved and stable distribution of air bubbles to the liquid to be aerated at a low air flow rate, thus enhancing energy efficiency.

Further, the inventive structure of the aeration element as an essentially flattened element with an oval cross section provides a greater surface area efficiency than known aeration devices that utilized round or tubular aeration elements, as discussed above. Further, the inventive corrugated profile of the support element in conjunction with the flexible sleeve provides increased longevity of the sleeve, preventing folds and creases in the sleeve that lead to fatigue and/or tearing of the elastomeric sleeve material, which can cause operating failure and damage to the aerating assembly.

Figure 15:
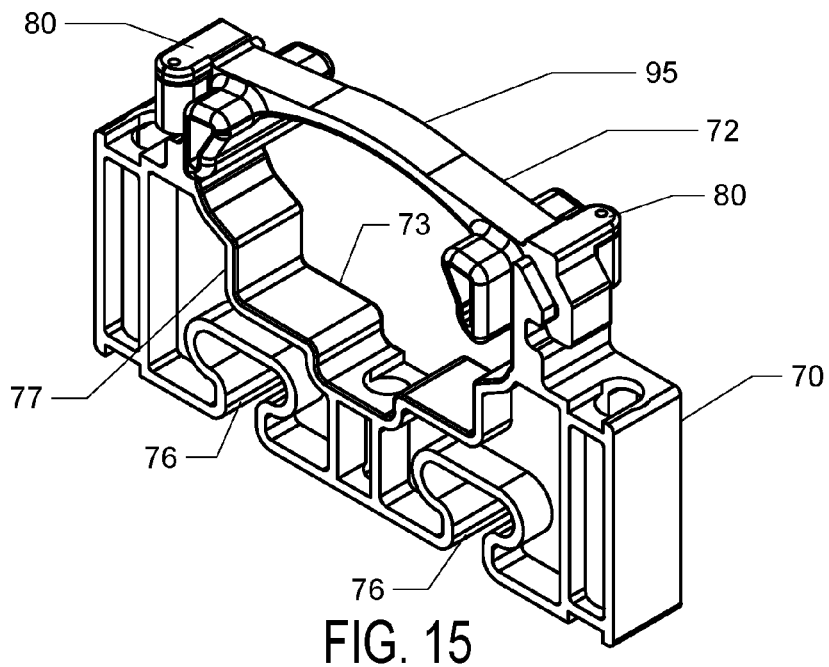
FIGS. 15 and 15A show perspective views of an assembly bracket according to a further embodiment.
Figure 15A:
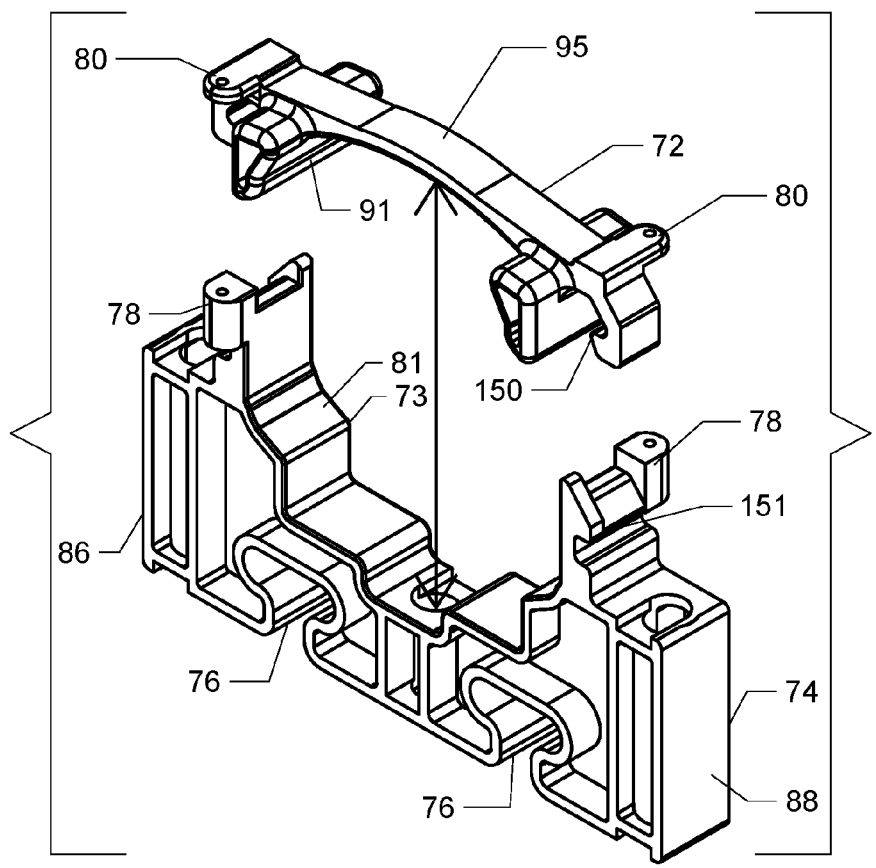

FIGS. 15 and 15A show a preferred embodiment of an assembly bracket 70 for securing the aeration element 1 to a support surface, such as the floor or bottom of a pool or tank. The assembly bracket 70 includes an upper profiled portion 72 and a lower profiled portion 74. The lower profiled portion 74 is an injection molded or machined part, preferably made of Polypropylene [PP], Polyamide PA, PVC or other hard thermoplastics, which includes a base portion 77, having a generally U-shaped, cut-out section 73 for accommodating an aeration element positioned therein. The lower profiled portion 74 of the assembly bracket 70 is formed to include through-going cut-out portions or passages 76 that extend through the cross sectional width of the assembly bracket 70 to facilitate water circulation when the brackets are in place on the floor or bottom of the tank or pool. The lower profiled portion 74 has lateral connecting flanges 78 positioned at the upper ends or legs of the U-shaped cut-out section 73, which are formed to cooperate with corresponding connecting flanges 80 provided on the upper profiled portion 72. Each of the upper profiled portion 72 and lower profiled portion 74 includes a respective shoulder 91, 81, respectively, which provide the only contact area for the diffuser element 1 when the assembly bracket 70 is in place.

The upper profiled portion 72 of the assembly bracket 70 includes an elongated, generally arched portion 95 extending between the connecting flanges 80. When the upper profiled portion 72 and the lower profiled portion 74 are secured together, the arched portion 95 extends over and above (but does not contact) a top surface 112 of the aeration element positioned within the assembly bracket 70, while the U-shaped portion of the lower profiled portion 74 extends below (but does not contact) the bottom surface 110 of the aeration element.

The aeration element only contacts the shoulder areas 81, 91 of the upper profiled portion 72 and lower profiled portion 74, respectively, as described above. The membrane purposely shall not make contact in other areas to prevent rubbing, pinching of the membrane sleeve, thus prolonging its useful life. The positioning of the assembly bracket 70 about the aeration element 1 in the manner described provides for a loose fit so membrane can flow around the shoulder area in the depressurized state.

The upper profiled portion 72 is formed to correspondingly fit onto to the lower profiled portion 74 at the respective connecting flanges 80, 78. More specifically, the upper profiled portion 72 of the assembly bracket 70 connects to the lower profiled portion 74 of the assembly bracket 70 by means of a snap-in, cooperating recess 150 and undercut 151, best shown in FIG. 15A.

Figure 16:
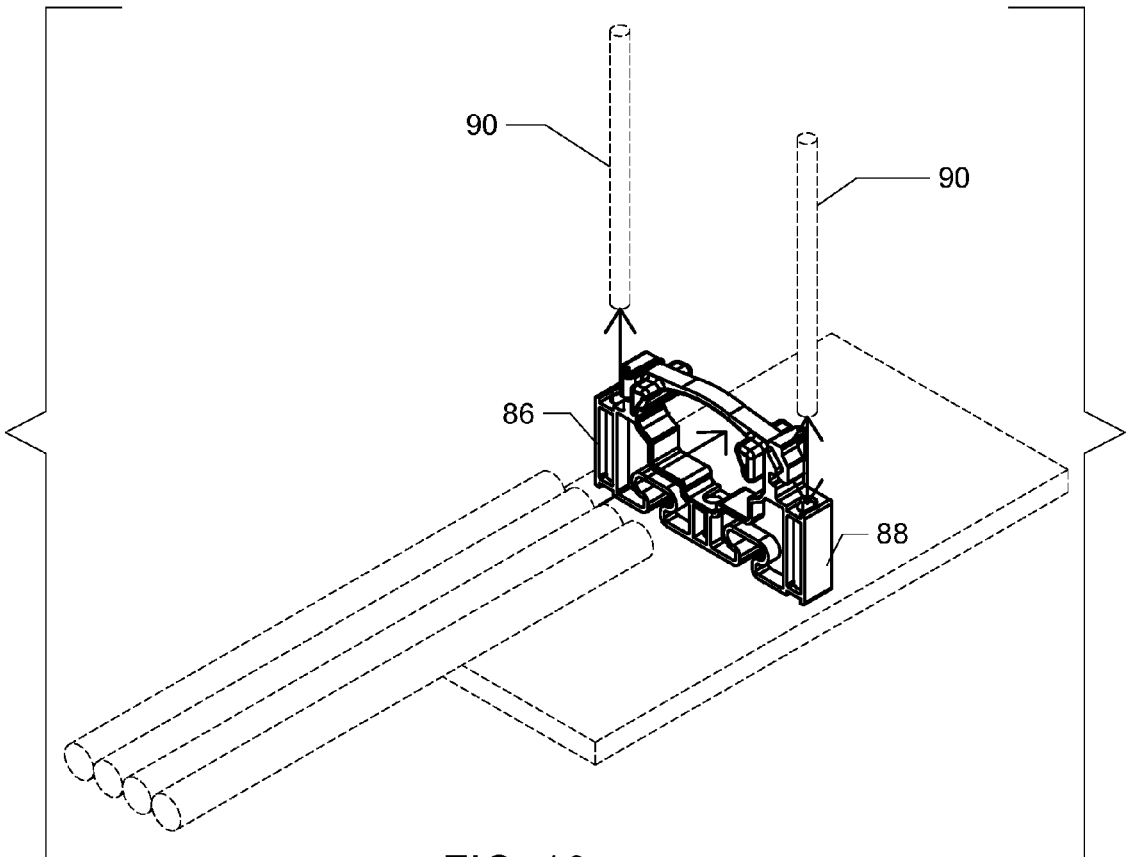
FIGS. 16 and 16A show perspective views of the assembly bracket according to FIGS. 15 and 15A positioned for mounting an aeration element to a support surface.
Figure 16A:
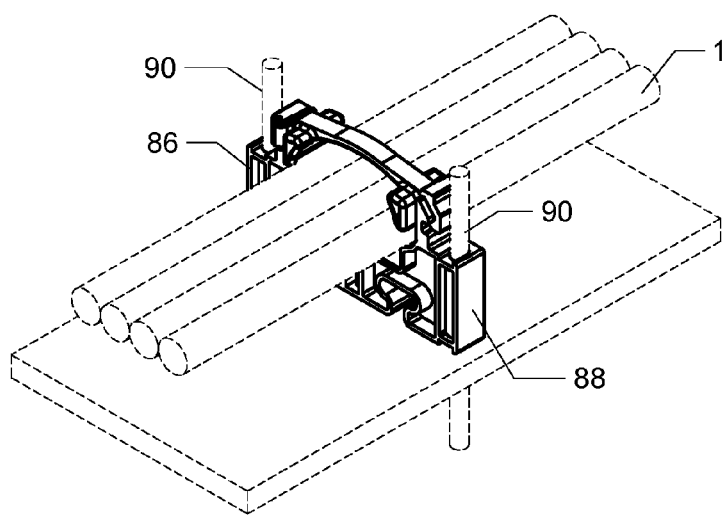

As best shown in FIGS. 16 and 16A, the lower profiled portion 74 further includes attachment portions 86, 88 for receiving fixing rods 90 therefore and for securing the assembly bracket 70 to the floor or bottom of the pool or tank. FIGS. 16A and 16B further show the assembly bracket 70 secured around an aeration element for holding the aeration element 1 in place during use in a tank or pool.

Figure 22:
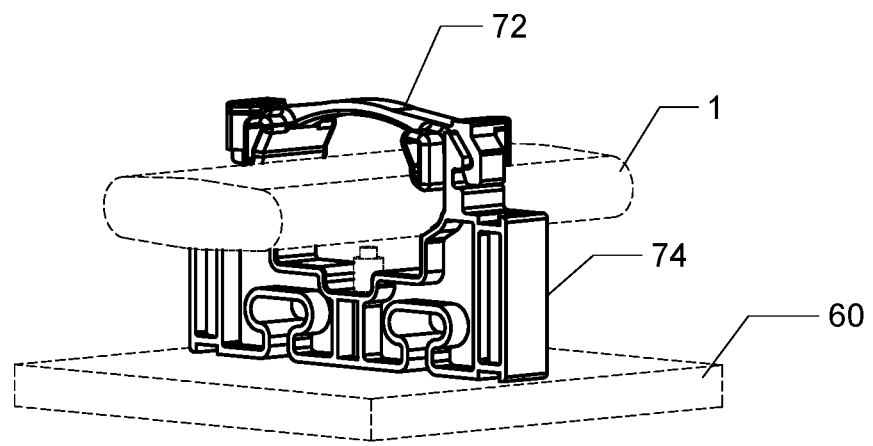
FIGS. 22 and 22A show a plan view and an end view, respectively, of an assembly bracket with a central bore and cooperating bolt.
Figure 22A:
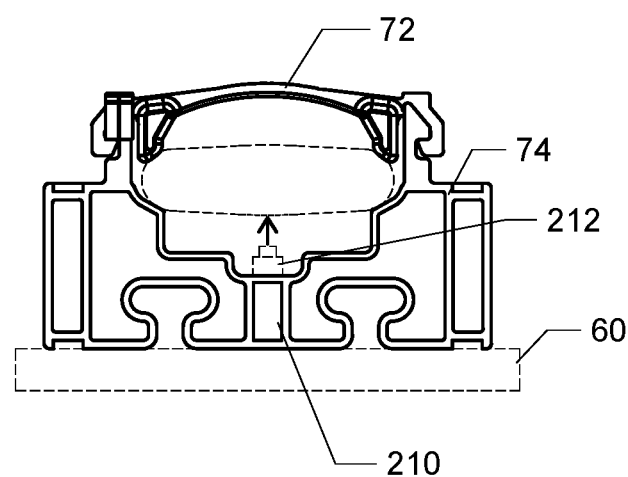

In the alternative, as best shown in FIGS. 22 and 22A, the lower profiled portion 74 may include a centrally located bore or hole 160, through which a bolt 162 extends into the floor or other supporting surface for the aeration elements.

FIGS. 16B and 16C show how a plurality of assembly brackets 70 can be utilized along the length of an elongated aeration element 1 or plurality of elements 1 to stably secure the aeration element(s) and reduce buoyancy when the aeration elements are positioned for use underwater, generally at the bottom of a holding tank or pool. As described above, the aeration element 1 according to the present invention can be configured at lengths of up to 4 meters or more to accommodate applications in larger tanks or pools. As such, a corresponding number of assembly brackets 70 can be positioned along the length of such an elongated aeration element 1 in order to provide the most effective stability and reduction of buoyancy for the specific application.

FIGS. 17 and 17A show a top view and side view, respectively, of an aeration element 1 position in an assembly bracket 70 in place on the floor or bottom 71 of a tank or pool. FIG. 17A provides an end view of an assembly bracket 70 positioned about an aeration element 1 and secured to the floor or bottom 71 of the tank or pool. FIG. 17A most clearly shows the generally through-going portions or passages 76 that extend through the lower portion 74, which permit water in the tank to circulate and flow through and around the assembly bracket 70.

Figure 18:
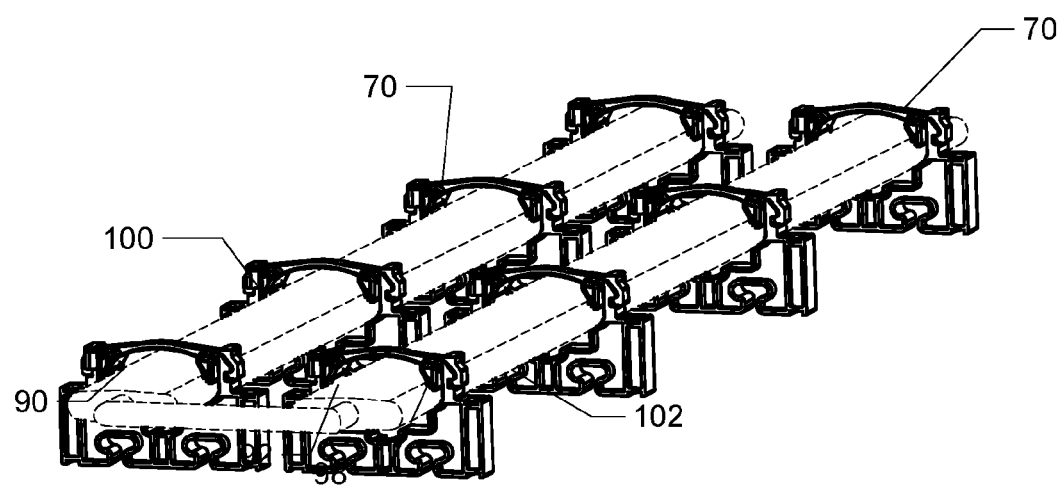
FIGS. 18-18B show plan views of a further configuration of the aeration devices having shorter lengths and connected at adjacent ends.
Figure 18A:
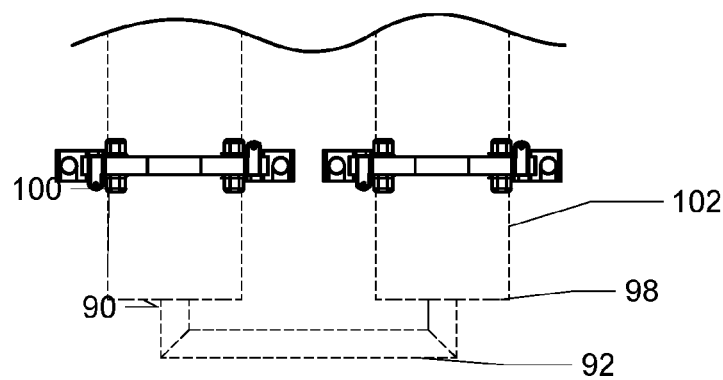
Figure 18B:
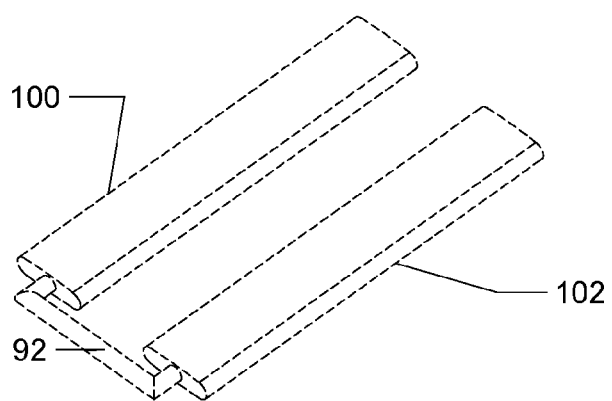
Figure 19:
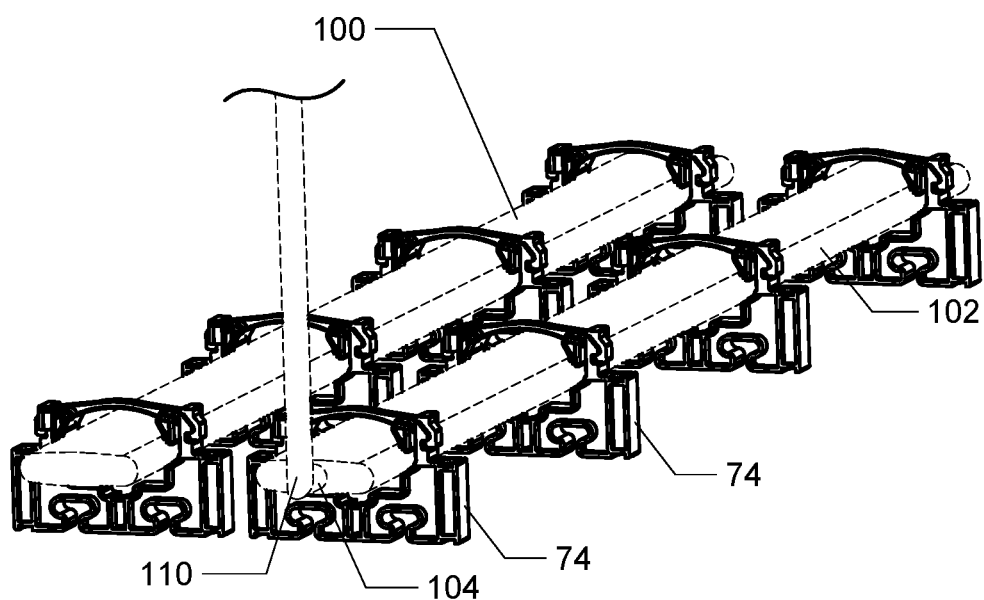
FIG. 19 shows a plan view of the opposite end of the adjacently arranged aeration elements of FIGS. 18A-18C.

In a further embodiment of the present invention, it is contemplated that the above-described aeration element 1 can be configured in shorter lengths, as best shown in FIGS. 18 through 19, to facilitate transporting, storage and placement of the aeration elements. Since larger and/or deeper pools or tanks of water could require very elongated aeration elements that are unwieldy to install and difficult to transport, it was found that aeration elements 100, 102 of substantially shorter lengths, for example, 1 to 3 meters, can be positioned adjacently or in series or rows along the center axis of the aeration elements in one or more assembly brackets 70 described above. Adjacent ends 90, 98 of the aeration elements 100, 102 are then connected via a suitable connection 92, for example, a hose clamp connection. In a preferred embodiment, each aeration element one to two meters in length for packaging and shipping compactness. Up to two aeration elements 100, 102 can be connected by a 1" hose clamp connection, for example, to form a four meter aeration element per each hose connection to the lateral air supply pipe. A two meter section of an aeration element requires two assembly bracket connections, preferably spaced 1 meter apart, and clamps anchored directly in the basin, tank or pool floor 200 with a single bolt, if the basin floor is level, or can be positioned with two threaded rods per assembly bracket in order to level the aeration elements on an uneven basin floor.

As best shown in FIG. 19, in one exemplary embodiment, a hose clamp 104, preferably a 1" hose clamp, is connected to a male connection (preferably, 1" NPT) in order to connect at least one of the two aeration elements, here 102, to a lateral pipe 110 at an end of the aeration elements 100, 102 that is opposite to the adjacent ends 90, 92 of the aeration elements 100, 102. Preferably, schedule 40 to schedule 80 PVC, lateral pipes (3" up to 12" in diameter) also round or square stainless steel (306 or 316) lateral pipes, are used and connected by using a 1" HDPTE, braided vinyl (PVC), or braided EPDM pipe or hose and stainless steel crimp hose clamps, although any type of other suitable hose-type fitting or coupling also is contemplated. The same connector hose clamp coupling is used to connect two aeration elements 100, 102 in order to extend the length of the aeration element from a 2 meter length to a 4 meter length per lateral connection.

With this configuration, the first aeration element 100 acts as an air conduit to the second aeration element 102. The reduced length of the aeration elements 100, 102 reduces potential buoyancy by flooding the center between the elements 100, 102, and indeed, the configuration of the shorter aeration elements connected as described, provides a greater tolerance for the entire assembly for greater buoyancy conditions.

Figure 20:
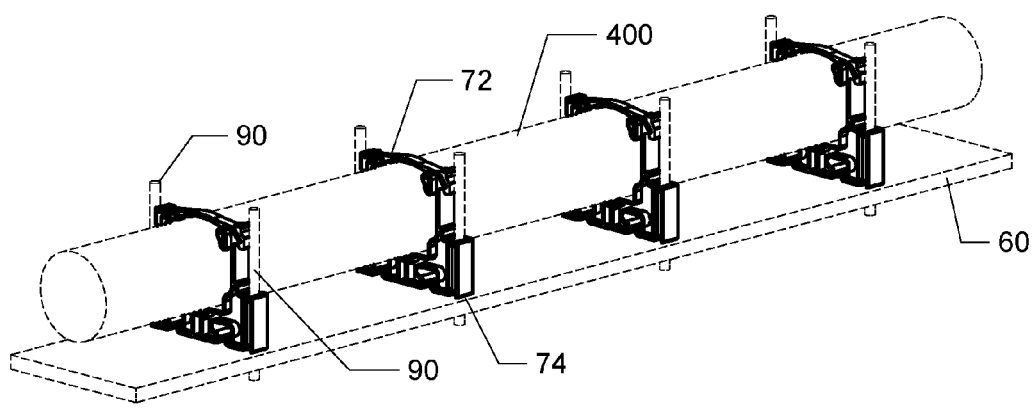
FIGS. 20-20A show a further embodiment of a rounded aeration element secured within a series assembly brackets.
Figure 20A:
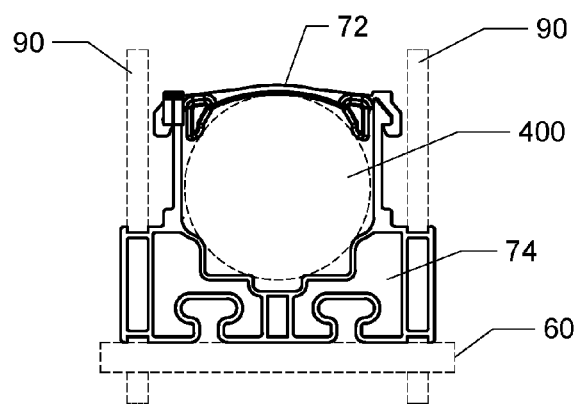

As shown in FIGS. 20 and 20A, the assembly bracket 70 according to the present invention also can be used with other shapes and types of aeration elements, such as the rounded configuration, or pipe-type element 400.

As discussed above and as illustrated in FIG. 21, rather than configuring the aeration element 1 has an elongated, single unit, as described above, a plurality of aeration elements 1 can be assembled in series, using cooperating connection ports (not shown in detail again in FIG. 21) and connecting hoses or tubes 240, to facilitate transport, storage, and placement of the aeration elements 1. The assembly brackets 70 can be spaced at regular intervals along the series of aeration elements 1 to provide adequate support and buoyancy for the series. Although not shown in FIG. 21, the aeration element positioned at an end of the series is then connectable to a main air supply, the individual aeration elements serve as a conduit for the air flow to the next aeration element in the series. This configuration with the series of aeration elements 1 connected end-to-end, in addition to offering the above advantages with regard to transport and storage, also offers flexibility in applications of use to more readily accommodate containers and tanks of various sizes; when the series of aeration element are used in conjunction with the assembly brackets 70, as shown, additional benefits with regard to buoyancy and flexibility in the water tank are also gained.

As noted above, as shown in FIGS. 22 and 22A, rather than using the two attachment portions 88 with cooperating pins/screws 90 shown in FIGS. 16 and 16A, a single, central hole or bore 210 can be provided in the lower profiled portion 74 to secure the lower profiled portion 74, as well as the entire assembly bracket 70, to the floor 60 of the tank or container.

Figure 23:
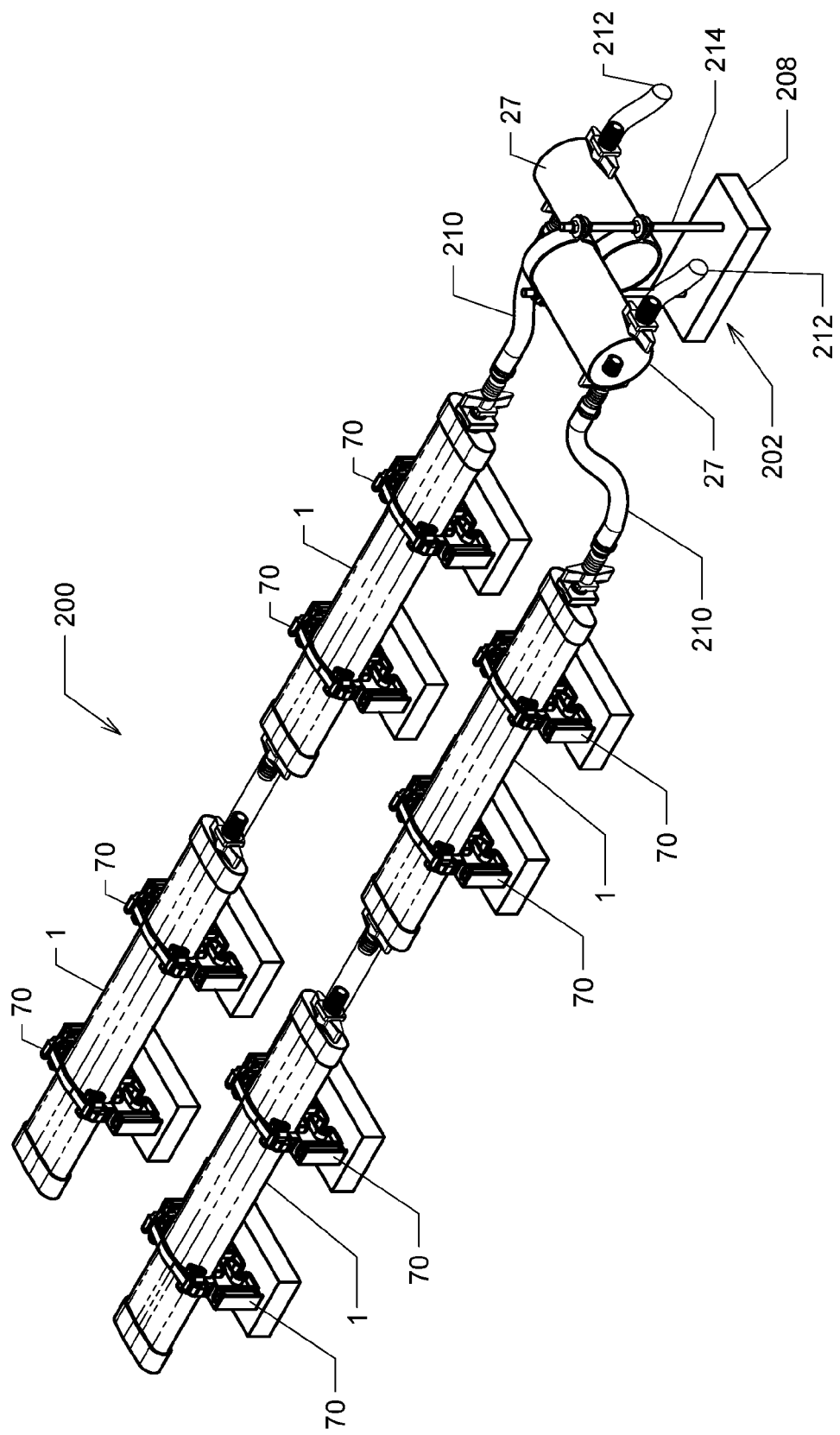
FIG. 23 shows a plan view of a dual air control aeration assembly according to the present invention with the cooperating coupling and mounting bracket assembly.

FIG. 23 shows a plan view of a dual control lateral air manifold assembly 200 according to the present invention. The structure of the aeration elements 1 is the same as that of the aeration element shown and described above with reference to FIGS. 1-22A. Likewise, the assembly brackets 70 described above can be utilized with the dual air control aeration assembly 200 in the manner described above; it is contemplated, of course, that other types of mounting assemblies could be used to secure the aeration elements 1 to a support surface.

As shown in FIG. 23, the dual control lateral air manifold assembly 200 of the present invention includes a plurality of aeration elements 1 connected, by way of example, in an end-to-end relationship as described above with reference to FIG. 21. Each of the aeration elements 1 is connected to an air distribution conduit 27 via a coupling device 210, which will be described in greater detail below with reference to FIGS. 24 and 25.

Figure 27:
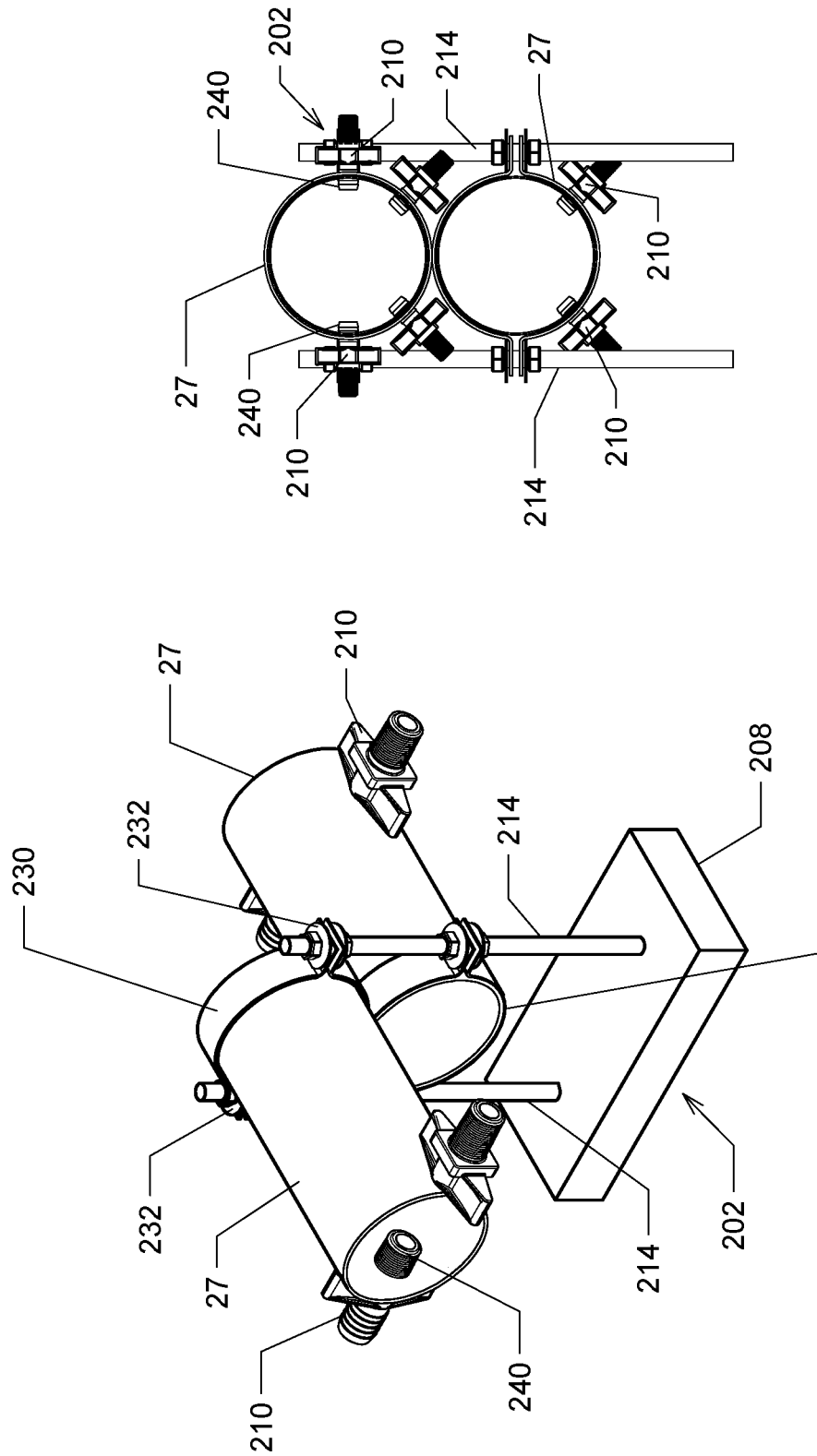

As shown in FIGS. 23, 27, and 27A, the assembly 200 further includes a dual conduit mounting assembly 202, which has a base 212 for securing the mounting assembly 202 to a support surface (such as a floor or base of a water treatment tank or pond); two substantially parallel securing rods 214; and respective mounting clamp assemblies 230 for securing each of the distribution conduits 27 to the securing rods 214 via adjustable nut and bolt assemblies 232 disposed in spaced relation on each of the securing rods 214.

Each distribution conduit 27 is provided with at least one through opening or port 240, arranged at predetermined positions about the circumference of the conduit 27. The through openings or ports 240 can be placed at selected positions, such as "9:00", "3:00", "6:00" about the circumference of the air conduit 27 to allow connection of multiple coupling devices 210 and aeration elements to the conduit 27, depending on the intended application and the selected configuration of the aeration elements in the water treatment system.

Thus, the coupling device 210 and conduit mounting assembly 202 provide a system with improved flexibility and scalability to accommodate a variety of configurations without the necessity of additional and separately mounted conduits. For example, as shown in FIG. 23, two air conduits 27 can be mounted and fixed in the conduit mounting assembly 202 in an offset, stacked relationship, which provides space saving advantage as well as improved energy savings over mechanically mixing aerators.

As noted above, each of the through openings or ports 240 is configured to receive a threaded end of a coupling device 210. As best shown in FIGS. 24, 24A, the coupling device 210 according to the present invention includes an elongated pipe or tube portion 304 having oppositely disposed first and second ends 306, 308, each of the first and second ends 306, 308 having an inner threaded region. The coupling device 210 further includes locking flanges 300, 302, each of the locking flanges 300, 302 have first and second threaded extensions 309, 312 and 310, 312, respectively. Threaded extension 310 is configured to be received into a receiving opening 240 of the air conduit 27, and threaded extensions 312 are configured to be received into the first and second ends 306, 308 of the elongated pipe portion 304 as shown in FIGS. 24 and 24A. Threaded extension 309 is configured to be received in a cooperating opening (not shown) in the end of the aeration element 1. The length of the elongated pipe or tube portion 304 may be selected as desired to accommodate the application. FIG. 24A shows the coupling assembly in an assembled state before attachment to the aeration element 1.

Figure 25:
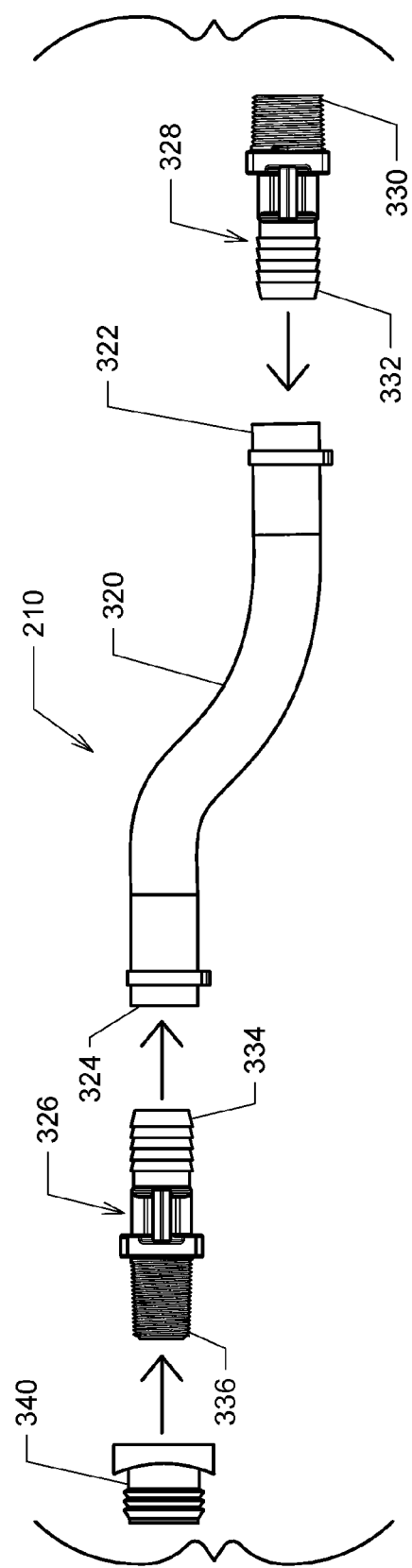
FIG. 25 shows a further embodiment of the coupling device.

As shown in FIG. 25, the coupling device 210 may be configured to have a bent or curved elongated tube portion 320, rather than a straight or linear configuration as shown in FIGS. 24 and 24A. The bent or curved elongated tube portion 320 has opposite ends 322, 324, which are configured to receive cooperating ends of adapter elements 328, 326, respectively. Specifically, adapter 328 includes a threaded end portion 332 for engagement with the tube portion 320 and threaded end portion 330 for engagement with the air conduit 27, while adapter 326 include a threaded portion 334 for engagement with end 342 of the tube portion 320 and threaded portion 336 for engagement with a further adapter 340 that serves to connection to the aeration element 1.

Figure 26:
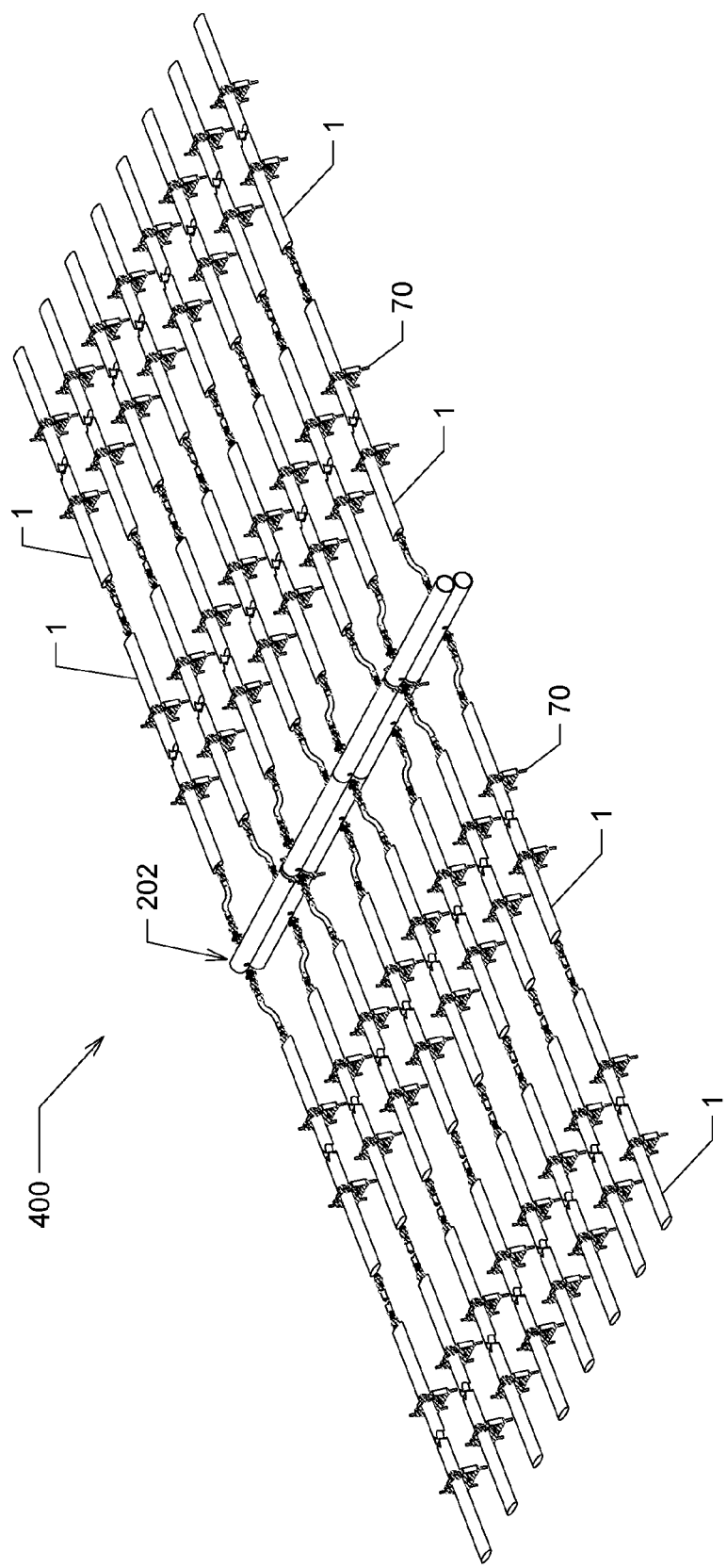
FIG. 26 shows a plan view of an assembly including a plurality of dual air control assemblies for water treatment.

FIG. 26 illustrates one possible configuration of a section of an aeration assembly 400, which includes a plurality of aeration elements 1 arranged end-to-end and the dual control lateral air manifold assembly.

It is further contemplated that up to three air supply conduits could be stacked on top of each other to address loading range, control options and/or redundancy concerns.

Figure 28:
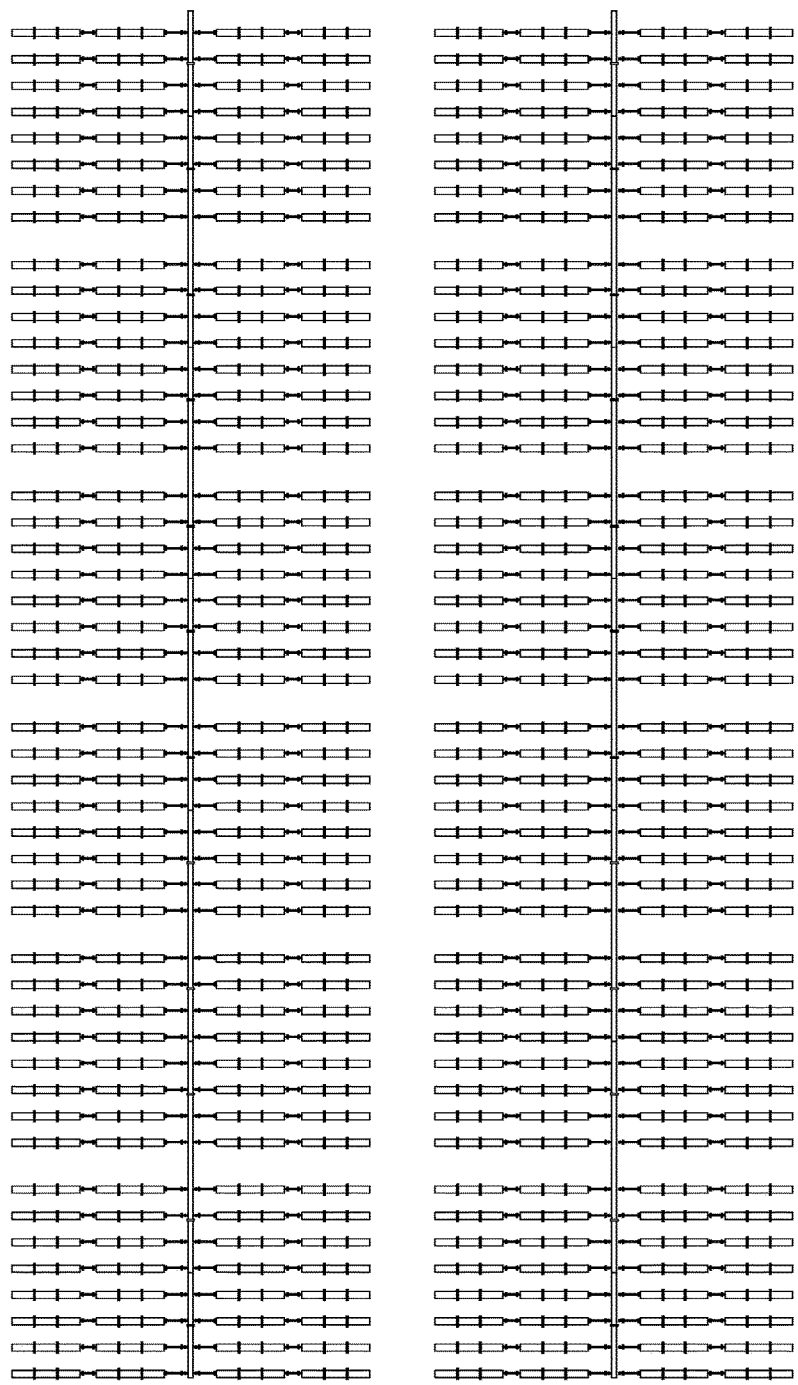
FIG. 28 shows the aeration elements arranged in zones.

Various other configurations of the aeration assembly 200 are also contemplated. For example, the sections of the aeration assembly can be arranged in zones, as shown in FIG. 28, such that the aeration elements 1 are arranged more densely in Zone 1, spaced further apart in Zone 2 than in Zone 1, and spaced even further apart in Zone 3, relative to Zones 1 and 2. In this manner, a more efficient arrangement of the aeration elements 1 is enabled and permits a progressive treatment of the water from Zone 1 through Zone 3 to facilitate optimal waste/sludge removal.

The specification incorporates by reference the disclosure of German priority document DE 101 50 180.3 filed Oct. 12, 2001, U.S. Pat. No. 7,497,421, and U.S. Pat. No. 6,769,673.

The present invention is, of course, in no way restricted to the specific disclosure of the specification and drawings, but also encompasses any modifications within the scope of the appended claims.

The invention claimed is:

1. An air control manifold assembly, comprising:
   at least two air distribution conduits that conduct air provided from a common air supply source to a plurality of aeration elements, wherein each of said at least two air distribution conduits includes a plurality of ports positioned with a predetermined distance from one another at preselected positions about a circumference of said at least two air distribution conduits for supplying air to the plurality of aeration elements;

a conduit mounting assembly, having a base for securing the mounting assembly to a support surface; two substantially parallel securing rods; and respective mounting clamp assemblies for securing the at least two air distribution conduits to the securing rods, wherein the at least two air distribution conduits are secured within the conduit mounting assembly at different heights relative to the base and offset relative to one another;

at least one coupling device having an elongated tube portion with oppositely disposed first and second ends and locking flanges configured to be received on said first and second ends of said elongated tube portion, wherein said at least one coupling device is configured for attachment to at least one of the plurality of aeration elements.

2. The air control manifold assembly according to claim 1, wherein the assembly includes a plurality of aeration elements connected in an end-to-end relationship.

3. The air control manifold assembly according to claim 1, wherein each of said at least two air distribution conduits is provided with at least one port arranged at predetermined positions about a circumference of the at least two air distribution conduits for connection of multiple coupling devices and aeration elements to each of said at least two air distribution conduits.

4. The air control manifold assembly according to claim 1, wherein each of said at least one port is configured to receive a threaded end of a coupling device therein.

5. The air control manifold assembly according to claim 1, wherein the elongated tube portion of said coupling device is curved or bent.

6. The air control manifold assembly according to claim 5, wherein the curved or bent elongated tube portion has opposite ends configured to receive cooperating ends of adapter elements, respectively.

7. The air control manifold assembly according to claim 6, further comprising at least one adapter element configured to receive said opposite ends of said elongated tube portion, wherein said at least one adapter element includes a first threaded end portion for engagement with the tube portion and a second threaded end portion for engagement with the at least two air distribution conduits.

8. The air control manifold assembly according to claim 1, wherein three air supply conduits are stacked on top of one another.

9. The air control manifold assembly according to claim 1, wherein the assembly comprises a plurality of zones, wherein in a first one of said zones, the aeration elements are arranged more closely relative to one another than in an adjacent, second one of said zones, and wherein said aeration elements are arranged more closely in said second one of said zones relative to one another than in an adjacent, third one of said zones.

* * * * *